(12) United States Patent
Sporrer et al.

(10) Patent No.: US 12,144,273 B2
(45) Date of Patent: Nov. 19, 2024

(54) MULTI-SENSOR TOOL HEIGHT CONTROL FOR GROUND ENGAGING TOOLS

(71) Applicant: Deere & Company, Moline, IL (US)

(72) Inventors: Adam D. Sporrer, Huxley, IA (US); Ricky B. Theilen, Bettendorf, IA (US); Lucas B Larsen, Ankeny, IA (US)

( * ) Notice: Subject to any disclaimer, the term of this patent is extended or adjusted under 35 U.S.C. 154(b) by 957 days.

(21) Appl. No.: 17/167,793

(22) Filed: Feb. 4, 2021

(65) Prior Publication Data

US 2021/0227742 A1    Jul. 29, 2021

Related U.S. Application Data

(63) Continuation of application No. 16/148,551, filed on Oct. 1, 2018, now Pat. No. 10,939,604.

(51) Int. Cl.
| | | |
|---|---|---|
| *A01B 63/16* | (2006.01) | |
| *A01B 63/24* | (2006.01) | |
| *A01B 63/32* | (2006.01) | |
| *A01B 76/00* | (2006.01) | |

(52) U.S. Cl.
CPC .............. *A01B 63/16* (2013.01); *A01B 63/24* (2013.01); *A01B 76/00* (2013.01); *A01B 63/32* (2013.01)

(58) Field of Classification Search
CPC ......... A01B 63/16; A01B 63/22; A01B 63/24; A01B 63/32; A01B 76/00
See application file for complete search history.

(56) References Cited

U.S. PATENT DOCUMENTS

| | | | | |
|---|---|---|---|---|
| 3,433,307 | A * | 3/1969 | Gilbert | A01B 63/24 |
| | | | | 172/414 |
| 4,600,060 | A * | 7/1986 | Winter | A01B 63/32 |
| | | | | 172/4 |
| 5,155,983 | A | 10/1992 | Sheehan et al. | |
| 5,348,226 | A | 9/1994 | Heiniger et al. | |
| 5,653,292 | A * | 8/1997 | Ptacek | A01C 7/203 |
| | | | | 172/310 |
| 5,918,448 | A | 7/1999 | Wheeler | |
| 6,076,611 | A * | 6/2000 | Rozendaal | A01B 63/32 |
| | | | | 172/474 |
| 8,576,056 | B2 | 11/2013 | Clair et al. | |
| 8,857,530 | B2 | 10/2014 | Henry | |
| 9,148,995 | B2 | 10/2015 | Hrnicek et al. | |
| 9,554,504 | B2 * | 1/2017 | Houck | A01C 7/203 |
| 9,609,800 | B2 | 4/2017 | Henry | |
| 9,901,031 | B2 | 2/2018 | Mott et al. | |
| 10,051,774 | B2 * | 8/2018 | Henry | A01B 79/005 |

(Continued)

FOREIGN PATENT DOCUMENTS

WO    2017158006 A2    9/2017

*Primary Examiner* — Jessica H Lutz
(74) *Attorney, Agent, or Firm* — Kelly, Holt & Christenson; Joseph R. Kelly

(57) ABSTRACT

A mobile machine includes a frame, and a set of wheels supporting the frame. The mobile machine also includes a set of ground-engaging tools mounted to the frame that are movable relative to the wheels to change a depth of engagement of the ground engaging-tools with ground over which the mobile machine travels. A first sensor senses a position of the frame relative to the ground surface over which the mobile machine is traveling. A second sensor senses a position of the frame relative to the wheels. The sensor signals from both sensors are used to control the frame height.

20 Claims, 14 Drawing Sheets

(56) References Cited

U.S. PATENT DOCUMENTS

| | | | |
|---|---|---|---|
| 10,440,876 B2 * | 10/2019 | Sporrer | A01B 63/14 |
| 10,517,238 B2 * | 12/2019 | Sporrer | A01G 25/097 |
| 10,645,856 B2 | 5/2020 | Stovall et al. | |
| 10,704,573 B2 | 7/2020 | Barrick et al. | |
| 10,750,653 B2 * | 8/2020 | Sporrer | A01B 5/04 |
| 11,284,612 B2 * | 3/2022 | Fox | A01B 47/00 |
| 11,730,076 B2 * | 8/2023 | Kovach | A01B 63/1112 |
| | | | 172/4 |
| 2003/0127235 A1 * | 7/2003 | Dannigkeit | A01B 63/32 |
| | | | 172/2 |
| 2006/0118653 A1 | 6/2006 | Shivak | |
| 2012/0227992 A1 | 9/2012 | Henry | |
| 2017/0251587 A1 | 9/2017 | Sporrer et al. | |
| 2018/0153088 A1 | 6/2018 | Sporrer et al. | |
| 2020/0068776 A1 | 3/2020 | North et al. | |
| 2020/0100420 A1 | 4/2020 | Sporrer | |
| 2020/0114843 A1 | 4/2020 | Foster et al. | |
| 2020/0196513 A1 | 6/2020 | Stovall et al. | |
| 2020/0236835 A1 | 10/2020 | Stanhope | |

\* cited by examiner

US 12,144,273 B2

MULTI-SENSOR TOOL HEIGHT CONTROL FOR GROUND ENGAGING TOOLS

CROSS-REFERENCE TO RELATED APPLICATION

The present application is a continuation of and claims priority of U.S. patent application Ser. No. 16/148,551, filed Oct. 1, 2018, the content of which is hereby incorporated by reference in its entirety.

FIELD OF THE DESCRIPTION

The present description relates to equipment. More specifically, the present description relates to sensing and controlling the height of a portion of a machine relative to the ground over which it is traveling.

BACKGROUND

There are a wide variety of different types of equipment including forestry equipment, construction equipment, turf management equipment, and agricultural equipment. These types of equipment often have many different mechanisms that can be controlled, at least to some extent, by an operator. Some of these mechanisms include mechanisms that are mechanical, electrical, hydraulic, and electrochemical, among others.

Some of these types of machines include tools that engage the soil. When using these types of machines, it is often desirable to control the operating depth of engagement of the tools with the soil. Furthermore, it is often desirable to maintain an operating depth consistently while a mobile machine travels across a worksite. If an operating depth is to be modified, it can also be important to ensure the depth is modified accurately and efficiently as the mobile machine travels across the worksite.

However, as the mobile machine travels across the worksite, a desired operating depth can depend on various conditions of the worksite surface. Such conditions can include, but are not limited to, soil composition, soil compaction, soil moisture level, and various other conditions. Based on the conditions, the operating depth, for any particular machine, may need to change in different areas of the worksite. However, accurately controlling operating depth, efficiently, can be problematic because of the varying conditions of the worksite.

Additionally, these types of machines often operate in relatively rugged physical terrain. They can operate on relatively steep grades, where the surface is uneven or has obstacles, or on terrain with varying levels of ground conditions.

The discussion above is merely provided for general background information and is not intended to be used as an aid in determining the scope of the claimed subject matter.

SUMMARY

A mobile machine includes a frame, and a set of wheels supporting the frame. The mobile machine also includes a set of ground-engaging tools mounted to the frame that are movable relative to the wheels to change a depth of engagement of the ground engaging-tools with ground over which the mobile machine travels. A first sensor senses a position of the frame relative to the ground surface over which the mobile machine is traveling. A second sensor senses a position of the frame relative to the wheels. The sensor signals from both sensors are used to control the frame height.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1A:
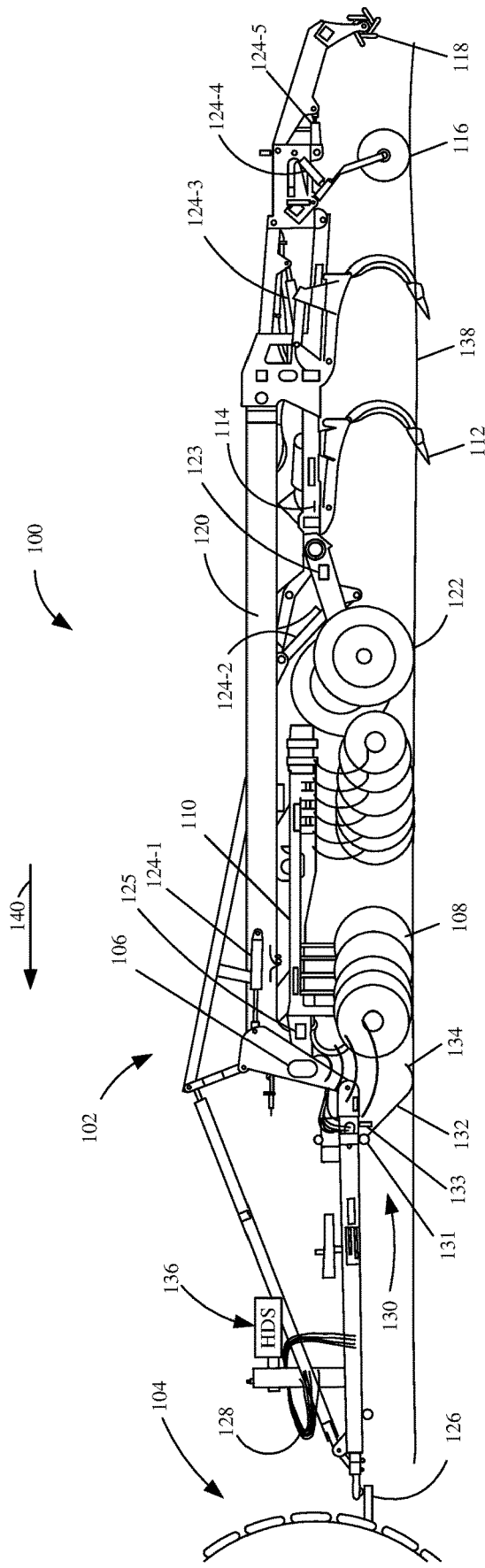
FIG. 1A is a perspective view showing one example of an implement with a ground-following device and corresponding sensor.

There are a wide variety of different types of agricultural machines used in the agricultural industry. Some of these machines can include tillage machines which include a wide variety of different ground-engaging tools that can be moved to a desired operating depth within the soil. These ground-engaging tools can include, but are not limited to, disks, ripper shanks, plows, blades, cultivators, harrows, and drills.

As mentioned above, when using these types of machines, it is often desirable to control the operating depth of engagement with the soil. Furthermore, it is often desirable to maintain an operating depth consistently while a mobile machine travels across a worksite. If an operating depth is to be modified, it can also be important to ensure the depth is modified accurately and efficiently as the mobile machine travels across the worksite. However, as the mobile machine travels across the worksite, a desired operating depth can depend on various conditions of the worksite surface.

To determine and control the depth of ground-engaging tools, some current systems use sensors such as Hall Effect sensors, or other types of sensors. In these systems, the sensors sense the position of a main frame of the mobile agricultural machine, relative to the wheels of the mobile agricultural machine. This is used to set the depth of engagement of the tools. However, these types of sensor systems do not always provide an accurate indication of the depth of engagement of the ground-engaging tools with the soil. Because these sensors sense the position of a frame relative to the wheels, the accuracy of such sensors is dependent upon the position of the wheels remaining reflective of true worksite surface height.

When an agricultural machine travels over a worksite that is, for example, soft, and a desired operating depth of 10 inches is set by the operator, the wheels may sink into the ground (e.g. an additional 3 inches). Thus, the sensor that senses the position of the main frame relative to the wheels will continue to sense an operating depth of 10 inches because it is only sensing the position of the main frame of the agricultural machine, relative to the wheels and does not account for the position of the wheels relative to the ground surface. In other words, even though the wheels have sunk into the worksite surface 3 inches, the position of the frame relative to the wheels remains the same because the offset between the wheels and the frame remains unchanged. In this example, however, the actual depth of engagement of the tools with the soil will be 13 inches instead of the desired 10 inches, because the wheels have sunk into the soil 3 inches.

Similarly, the wheels may encounter uneven ground or obstacles along the worksite surface. This may cause the wheels to ascend to a height that is not reflective of true worksite surface level, and thereby raise the operating depth of the ground-engaging tools without providing accurate feedback to the operator indicating such an ascension. Consistent, accurate, and efficient operating depth across a worksite surface may be desired in many agricultural operations, and these current systems can often lead to inconsistency.

To address these issues, sensors, such as radar, sensors, can be used to sense the worksite level relative to the frame and give feedback as to the distance of the frame above the worksite surface and thus more accurately determine and maintain operating depth of ground-engaging tools. However, these types of sensors can have trouble when the surface is uneven, such as when mobile agricultural machine encounters obstacles like debris, residue, rocks, root balls, stumps, etc. Obstacles on the worksite surface can give a false indication of the position of the true worksite surface, which in turn causes the machine to move the ground-engaging tools to, or maintain them at, an undesired operating depth. By way of example, a radar sensor may be mounted to the frame of the agricultural machine and be directed to sense a distance between the frame and the worksite surface. However, if the machine travels over a portion of a field where the ground surface is covered with several inches of residue, the radar sensor will measure from the top of the residue mat and thus give an inaccurate indication of the frame height above the actual surface of the ground.

Thus, to be accurate, these types of sensor signals often need to be heavily conditioned, such as filtered, averaged, etc. all of which takes time. This negatively affects the responsiveness of the control system controlling the depth of engagement of the tools.

FIG. 1A is a perspective view showing one example of a mobile agricultural machine architecture 100 with a ground-following device 130 and corresponding sensor 106. Mobile agricultural machine architecture 100 includes implement 102 (which may also be referred to as a mobile machine), towing machine 104, sensor 106, disks 108, disk frame (or subframe) 110, ripper shanks 112, ripper shank frame (or subframe) 114, closing disks 116, harrow 118, main frame 120, wheels 122, sensors 123, actuators 124-1, 124-2, 124-3, 124-4, 124-5 (collectively referred to as actuators 124), sensor 125, coupling assembly 126, wiring harness 128, ground-following device 130 (which includes biasing member 132, and indicating surface 134), actuator 133, and height determination system 136. Implement 102, in FIG. 1A is being towed by towing machine 104 along worksite surface level (or ground level) 138, in travel direction 140.

Towing machine 104 is coupled to implement 102 by coupling assembly 126. Towing machine 104, which may be a tractor or any number of suitable machines, pulls implement 102 (or mobile machine 102) in travel direction 140. Towing machine 104 can include other movable tools, such as forks or a bucket, a cab, inside of which could be any number of user interfaces such as levers, pedals, steering wheel, joysticks, display screens, and any other suitable user interfaces capable of receiving an operator input. Coupling assembly 126 is illustratively shown as a hitch, but can be any number of suitable couplings, such as a power takeoff, hydraulic couplers, etc.

An operator may operate machine 104 to tow implement 102 onto worksite surface 138 and set an initial frame height of, for example, main frame 120 relative to wheels 122. The position of main frame 120 relative to wheels 122 can be sensed by sensor 123, (which maybe a Hall Effect sensor or a potentiometer, etc.). The initial frame height set by the operator, via a user interface, sets an initial operating depth of disks 108, ripper shanks 112, closing disks 116, and/or harrow 118. When the user sets an initial operating depth through a user interface, actuators 124 (which can include any number of suitable actuators, such as, hydraulic cylinders, adjust the position of frame 120, relative to wheels 122. Actuators 124 are hydraulically or electrically coupled to towing machine 104 via coupling assembly 126 and wiring harness 128. When an operator sets an operating depth, a controller (described below) sends a control signal to adjust actuators 124.

As towing machine 104 tows implement 102 in travel direction 140, sensor 106, in combination with ground-following device 130, senses a distance from sensor 106 to worksite surface 138 and generates a sensor signal indicative of that distance. A height of main frame 120 relative to worksite surface level 138 can be derived from the signal. Sensor 106 can be any number of suitable sensors, including, but not limited to, ultrasonic, radar, lidar, optical or other sensors. Mobile agricultural machine or architecture 100 can encounter obstacles such as debris, residue, stumps, root balls, etc. which can cause sensor 106 (without ground-following device 130) to generate a signal that is an inaccurate indication of the height of main frame 120 relative to worksite surface 138 because instead of sensing the distance to surface 138, it senses the distance to the top of the obstacle. To address this, ground-following device 130 is attached to the frame of implement 102. The ground-following device 130 has a proximal end attached to main frame 120, or to another frame that has a known position relative to main frame 120.

Ground-following device 130 engages worksite surface 138 and is configured so its distal end rides on top of, and maintains contact with, worksite surface 138 as implement 102 moves in travel direction 140. Sensor 106 is coupled to frame 120 and positioned relative to ground-following device 130 such that sensor 106 senses indicating surface 134 on the distal end of ground-following device 130.

Ground-following device 130 is biased toward, and configured to maintain contact with, worksite surface 138 by biasing member 132. Biasing member 132 can be an extending arm portion that is made of a resilient material (such as a spring metal or other material) so that it biases the distal end into contact with surface 138. It can also be any number of other suitable biasing members such as a spring, an air bladder system, a weight, a hydraulic cylinder, a magnet, etc.

Ground-following device 130 may comprise a ski-type device that mats down or cuts through obstacles on worksite surface 138 such that it maintains contact with true ground level of worksite surface 138 (within a desired tolerance). In this way, indicating surface 134 can provide an accurate representation of the true ground surface level. Thus, for example, ground-following device 130 may have a generally narrow downwardly facing surface, or a wider surface (such as a semi-spherical surface) with a leading edge (in the direction of travel) shaped to cut through or displace debris, such as residue, or root balls, so the downward facing surface stays in contact with the ground surface 138. However, ground-following device 130 is also configured to stay on the top of surface 138 even when it is relatively soft or muddy. Thus, even if wheels 122 sink into surface 138, device 130 rides along the top of surface 138. Device 130 can thus be shaped in a wide variety of different ways. It can be relatively simple (such as a J-shaped wire or flat metal piece) or more complex (such as a semi spherical bottom with a leading cutting edge). All of these and other shapes are contemplated herein. Ground-following device 130 can also be a wheel, or any other suitable device capable of matting down or cutting through obstacles on a worksite surface but riding on top of soft soil, such that it can provide an accurate indication of the true worksite surface level. This eliminates or reduces false indications of the true ground surface level.

In one example, ground-following device 130 can be operably moved by an actuator 133 such that the level of engagement or bias force of engagement with the worksite surface 138 can be adjusted. The actuator 133 can be, for example, a hydraulic actuator that operates to rotate device 130 about a pivot point (such as point 131) relative to the frame it is attached to. The actuator 133 can be controlled based on a wide variety of criteria. For instance, soil conditions can be sensed or otherwise obtained and used to control actuator 133. As an example, if soil moisture is high (or the soil is soft for another reason), then the actuator 133 can be controlled to exert less force so device 130 rides on the surface without it sinking below the surface. If the soil is harder or there is a heavy mat of residue, the actuator 133 can be controlled to exert more force. These are just examples.

Sensor 106 generates a sensor signal indicative of a distance from sensor 106 to the level indicating surface 134 of device 130 and sends the sensor signal to height determination system 136. Height determination system 136 receives the sensor signal and determines a height of frame 120 relative to the ground surface 138 and then determines an operating depth of ground-engaging tools like disks 108, ripper shanks 112, closing disks 116, or harrow 118. It does this by also knowing the position of these tools relative to frame 120. For example, an additional sensor 125 may sense the offset of subframe 110 relative to main frame 120. This, along with the known geometry of subframe 110 and disks 108, can be used to determine the depth of engagement of disks 108 with the soil. Height determination system 136 can then communicate the operating depth (or depth of engagement of the tools) to a user interface in towing machine 104 where an operator can view it and can adjust the operating depth, via actuators 124, as desired. Alternatively, or in addition, the operator can set a threshold for a desired depth (or the threshold can be automatically set), and upon determining the operating depth, height determination system 136 can send a control signal to actuator 124 to automatically adjust the operating depth of the ground-engaging tools if they are outside of the threshold, without further operator involvement.

While mobile agricultural machine architecture 100 is illustratively in the form of a tillage implement 102 and a towing vehicle 104, a wide variety of other implements or machines (e.g., self-propelled machines) may be used as well.

Figure 1B:
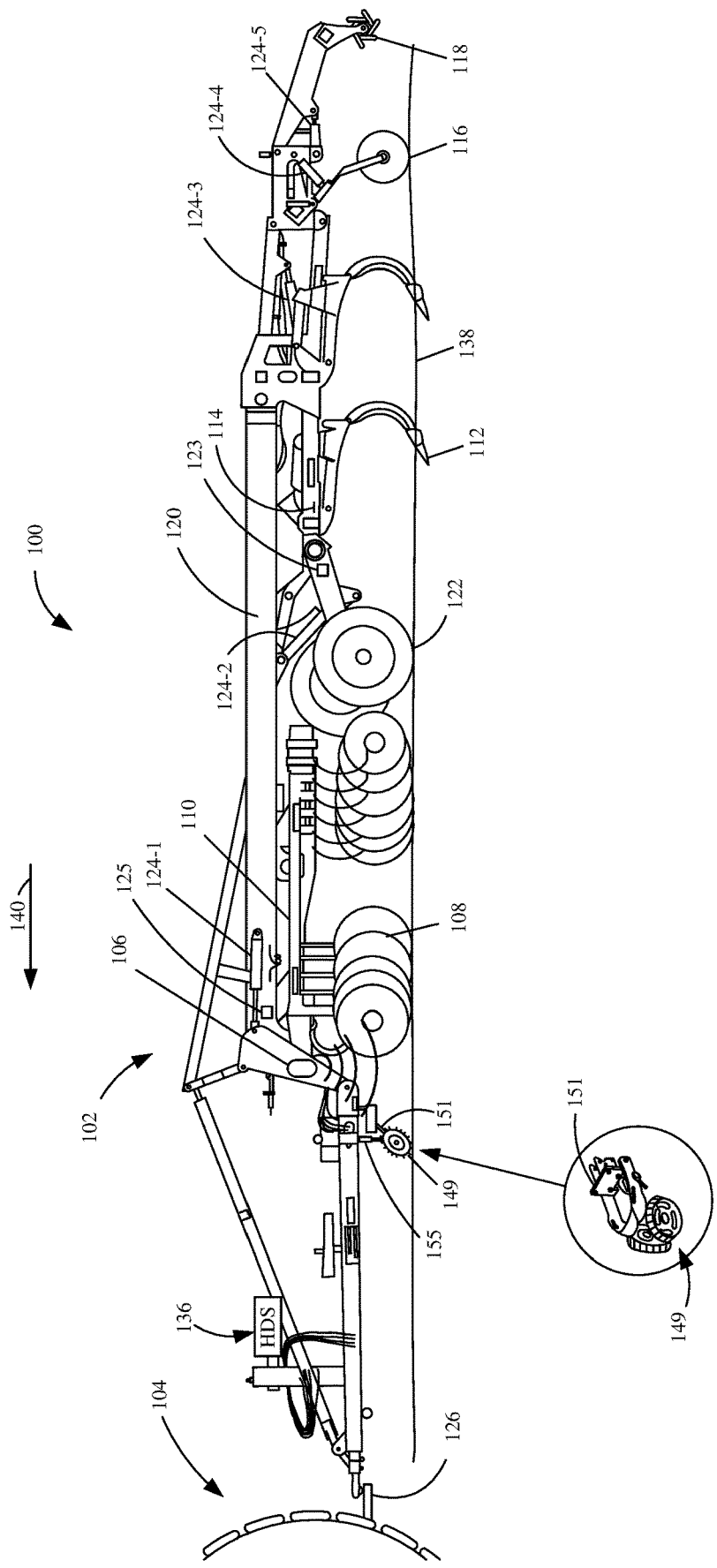
FIG. 1B is similar to FIG. 1A except that the implement has a surface cleaning mechanism instead of the ground following device.

FIG. 1B is similar to FIG. 1A, and similar items are similarly numbered. However, FIG. 1B shows that, instead of having ground following device 130, implement 102 has ground cleaning device or mechanism 149 which is coupled to implement 102 by connection mechanism 151. Ground cleaning device 149 can also be biased into contact with the ground surface 138 by a biasing member 155, which can be an actuator or another biasing member. Biasing member 155 can also be part of connection mechanism 151. As examples, bias member 155 can be a spring, a weight, an air bladder, or an actuator (like actuator 133 shown in FIG. 1A).

As implement 102 is towed in the direction indicated by arrow 140, ground cleaning device 149 cleans and smooths the ground surface 138 ahead of sensor 106. Thus, in the example shown in FIG. 1B, sensor 106 is positioned on implement 102 so that it senses the ground surface 138 behind ground cleaning device 149, relative to the direction of travel indicated by arrow 140. Ground cleaning device 149 can be any suitable type of ground cleaning device that removes residue, root balls or other obstacles from the surface over which it travels. One example is shown in the enlarged view discussed below with respect to FIG. 1C.

When bias member 155 is implemented as an actuator, the force of engagement of surface cleaning device 149 with the ground surface 138 can be controlled based on a wide variety of different criteria. For instance, it can be manually adjusted by an operator of machine 104, based on his or her observation. It can also be controlled, automatically, based on sensed criteria, such as soil characteristics (e.g., soil moisture, soil compactness, etc.). It can be controlled based on other sensor inputs as well. For instance, an optical sensor may be deployed to sense the presence of residue, root balls, etc. in the path of sensor 106. When the optical sensor senses the presence of such items, then it may be that the force exerted by actuator 155 on surface cleaning device 149 is increased in order to cut through a residue mat, to move other debris (such as root ball), etc.

Figure 1C:
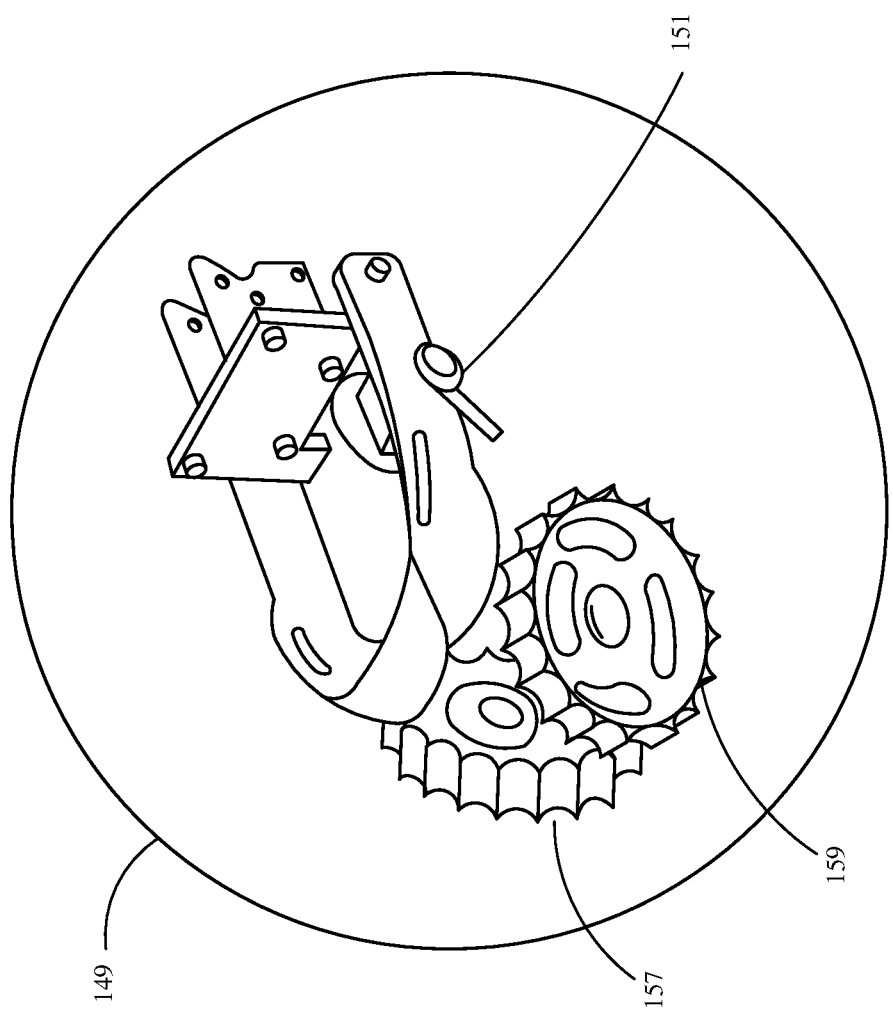
FIG. 1C is an enlarged view of one example of a surface cleaning mechanism.

Surface cleaning device 149 can be arranged in a wide variety of different ways. For instance, it can be a device such as that shown in FIG. 1C. FIG. 1C shows that, in one example, surface cleaning device 149 has two generally opposed discs, 157 and 159. The two discs have opposing blades that, when discs 157 and 159 rotate, overlap with one another in an interdigitated fashion. This enhances the ability of device 149 to clean or move items (e.g., residue, obstacles, debris, etc.) from the path over which sensor 106 will travel. It will be noted that, in the example where device 149 includes opposing discs 157 and 159, rotation of the discs can be driven by their engagement with the ground, or it can be driven by one or more separate motors.

At this point, it will be appreciated that, while sensor 106 is shown mounted on main frame 120, it could be mounted on other frame portions or subframes as well. As long as an offset indicative of sensor 106, relative to the ground engaging tools, can be sensed or otherwise obtained, sensor 106 can be disposed on substantially any portion of implement 102 or vehicle 104.

Also, while only a single sensor 106 is shown, it is contemplated that a multitude of sensors 106 and a multitude of ground-following devices 130, or surface cleaning devices 149, or any combination thereof, can be coupled to the mobile machine 102 at multiple and various positions. For instance, implement 102 may have different sections. A section can be a main frame 120, a wing, and/or subframes that are all controlled relative to a frame height position. Such a plurality of sensors 106 can increase the accuracy of the sensed height and the depth of engagement by accounting for varying ground conditions encountered by the mobile agricultural machine at different areas of the implement 102. For instance, the height of the worksite surface on the left side of, for example a tillage machine, can be higher or lower or contain more residue or obstacles than that on the right side of the tillage machine. These differences can be accounted for by placing ground-following devices 130 or surface cleaning mechanisms 149 and corresponding sensors 106 at different locations on implement 102. All of these, and other arrangements, are contemplated herein.

Figure 2:
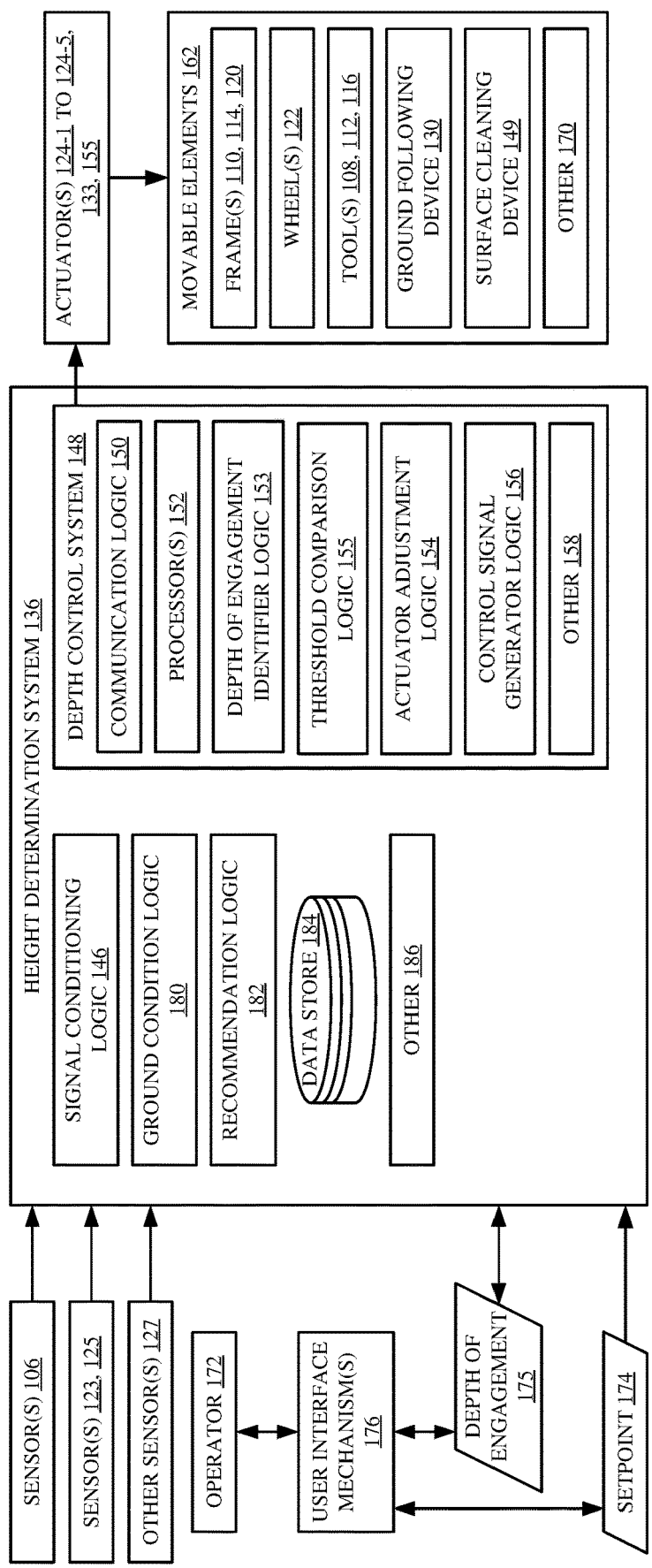
FIG. 2 is a block diagram showing one example of a height determination system in more detail.

FIG. 2 is a block diagram showing one example of a height determination system 136 in more detail. Height determination system 136 includes sensor(s) 106, 123, 125, other sensors 127, signal conditioning logic 146, depth control system 148, ground condition logic 180, recommendation logic 182, data store 184 and it can include other items 186. Depth control system 148 includes communication logic 150, processor(s) 152, depth of engagement identifier logic 153, actuator adjustment logic 154, threshold comparison logic 155, control signal generator logic 156, and it can include other items 158.

FIG. 2 shows that system 136 can control actuators 124, 133 and 155 which, in turn, control movable elements 162. Movable elements 162 can include subframe(s) 110, 114, wheels 122, tool(s) 108, 112, and 116, ground following device 130, surface cleaning device 149, and it can include other movable elements 170. FIG. 2 also shows that system 136 can receive inputs (such as a setpoint 174) from operator 172, through user interface(s) 176, and provide outputs (such as a depth of engagement indicator 175) through user interface 176 as well.

Operator 172 controls towing machine 104 to tow an implement (or mobile machine) 102, onto a worksite. Operator 172 can be within a cab of a towing machine 104 or can control the towing machine 104 remotely. Operator 172 can be an artificial intelligence (AI) assisted program which automatically controls the towing machine 104. Operator 172 determines setpoint 174 which is a desired operating depth for tool(s) 108, 112, and 116. Again, the tools can include disks, harrows, ripper shanks, etc. Once setpoint 174 has been set by operator 172 (or automatically determined), setpoint 174 is input to height determination system 136. User interface mechanism(s) 176 can be joysticks, levers, hydraulic controls, displays, or any other suitable user interface mechanism capable of receiving operator input. Movable elements 162 are set so the tools 108, 112, 116 reach the level of engagement represented by setpoint 174. Operator 172 then begins towing the implement 102 in the travel direction 140.

Once moving in the travel direction 140, frame height sensor 106 senses the height of the frame above the ground surface 138. It can do this by sensing the position of ground-following device 130 relative to frame 120. It can also do this by sensing the position of the ground surface 138 behind surface cleaning mechanism 149. In the example in which sensor 106 is on main frame 120, sensors 123 and 125 sense the position of a tool frame (or subframe 110, 114) relative to main frame 120 of the implement 102. Frame height sensor(s) 106, 123, and 125 each send a signal indicative of the variable they sense to signal conditioning logic 146, which can be an analog/digital convertor, amplifier, normalization logic, linearizing logic, and/or a filter, etc. Signal conditioning logic 146 sends a conditioned signal, based on the received signals from frame height sensor(s) 106, 123, and 125 to depth control system 148.

Communication logic 150 receives the conditioned signals and processor(s) 152 control depth of engagement identifier logic 153 to determine the operating depth of tool(s) 108, 112, and/or 116. This is described in more detail below, and an indication 175 of the depth of engagement can be communicated to operator 172 via user interface mechanism(s) 176, for example, via a display. Additionally, or alternatively, threshold comparison logic 155 can compare the depth of engagement of the tool(s) to the operator determined setpoint 174, and if logic 155 determines that the depth of tool(s) 108, 112, and/or 116 is not within a threshold of setpoint 174, actuator adjustment logic 154 determines the amount of adjustment required by actuator(s) 124-1 to 124-5 to bring the depth of engagement of tool(s) 108, 112, and/or 116 within the threshold of setpoint 174. Once the amount of adjustment is determined, control signal generator logic 156 generates a control signal based on the determined amount of adjustment and communicates it to actuator(s) 124-1 to 124-5 through communication logic 150.

A data store 184 can store sensor data, height determination data, threshold data, tool depth data, the dimensions of implement 102, etc. The stored values can be used to reestablish a desired tool depth. For instance, the settings for actuators 124 can be stored when the tools on implement 102 are raised so machine 104 can make a headland turn. Once the turn is complete, the actuator settings can be retrieved and automatically reset so the depth of engagement can be retrieved and need not be recomputed, based on the sensor signal values, at the beginning of each pass. Data store 184 can also store actuator settings indexed by soil conditions, geographic position or other criteria. When those criteria are present, the actuator setting values can be used to establish a depth of engagement. These are just examples of how the depth of engagement can be set using data from data store 184.

Ground condition logic 180 illustratively tracks and stores data regarding conditions of the worksite surface (e.g. soil conditions) and stores data in data store 184 and can display the data on user interface mechanism(s) 176 via communication logic 150. It can receive the ground condition data from various sensors. It can also store the various sensor signal values from sensors 106, 123, 125 and 127 at different geographic locations along the worksite (e.g. different passes through a field).

Recommendation logic 182 can generate a recommended operating depth which can then be displayed on user interface mechanism(s) 176 via communication logic 150, and it can be used to automatically control tool depth. In determining a recommendation, logic 182 can use historical data from data store 184, or geographically tagged data from a previous pass (also from data store 184), or other data to anticipate changes to the actuator control signals. Recommendation logic 182 can also use ground condition data identified by ground condition logic 180, frame height data from depth control system 148 or other data which can include, for example, depth requirements of seed species being planted or optimal depth of fertilizer. Recommendation logic 182 can then determine and generate a recommendation for operating depth which can be displayed on user interface mechanism(s) 176 via communication logic 150 or which can be used to automatically control the actuators to move the tools to the recommended depth of engagement.

Figure 3:
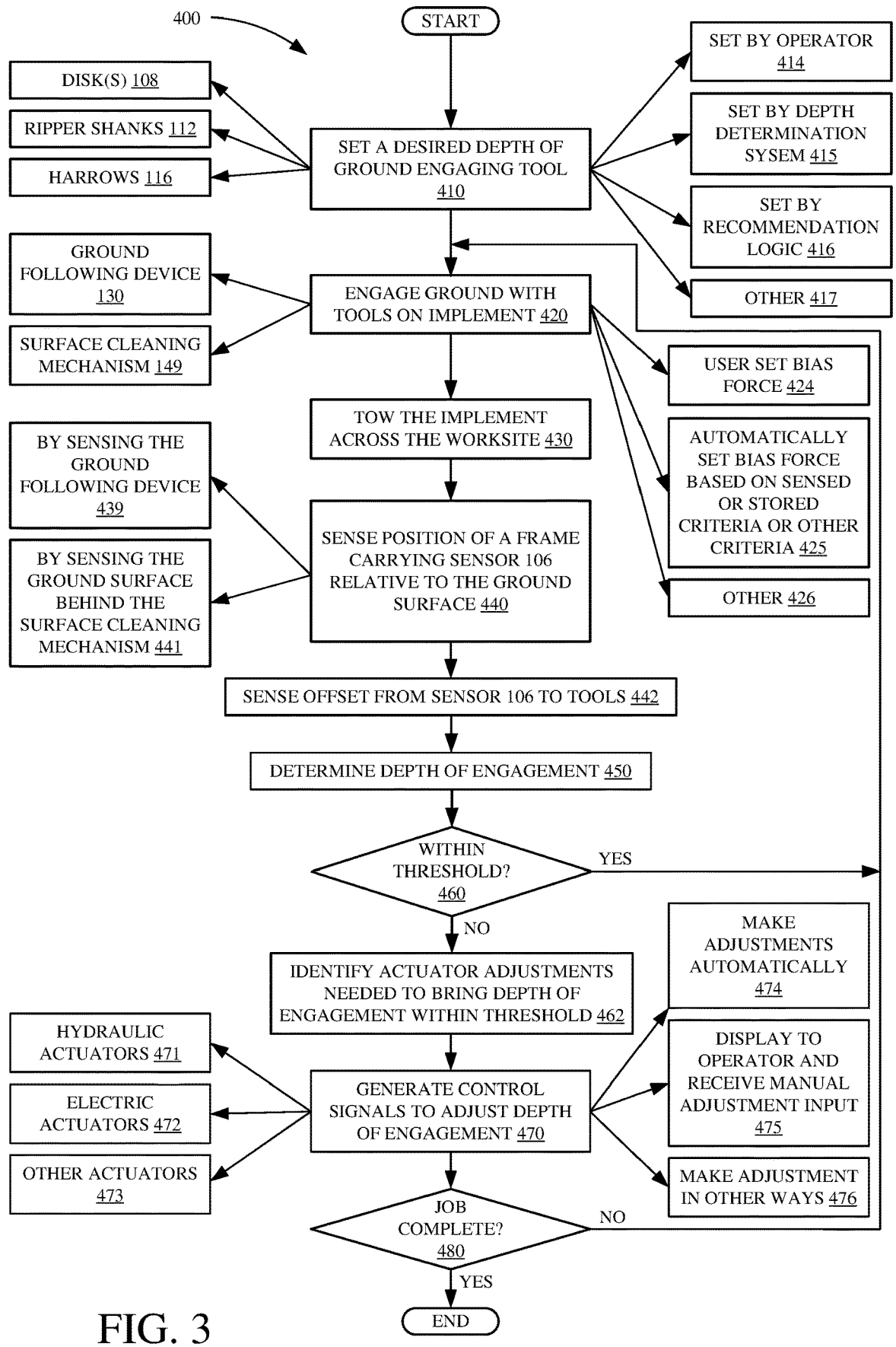
FIG. 3 illustrates a flowchart showing one example of determining the position of a part of a mobile agricultural machine.

FIG. 3 illustrates a flowchart showing one example operation of architecture 100 in controlling the depth of engagement of ground engaging tools on a mobile machine 102. The operation 400 begins at block 410 where a desired operating depth of a ground-engaging tool is set. The ground-engaging tool can include disk(s) 108, ripper shank(s) 112, harrows 116 or other tools such as blades, plows, cultivators, drills, and other ground-engaging tools on to mobile agricultural machines. The desired operating depth set at block 410 can be set by the operator as indicated by block 414, based on, for example, the operator's own observation or other knowledge. The operational depth can be set based on control signals output from control signal generator logic 156, in order to make automatic depth adjustments. This is indicated by block 415. The operational depth can be a recommended depth output by recommendation logic 182, as indicated by block 416 or based on other items as indicated by block 417.

Operation 400 proceeds at block 420 where the implement 102 engages the ground with the tools 108, 112, 116, and ground following device 130 or surface cleaning mechanism 149, or both. The worksite can also be engaged by other items, such as any suitable device capable of indicating a true worksite level as described above. The user can manually set the bias force for ground-following device 130, and/or ground cleaning mechanism 149 using actuators 133, 155. This is indicated by block 424. The bias force of ground-following device 130 and/or surface cleaning mechanism 149 can also be controlled automatically, as indicated by block 425. The engagement through automation can be based on data from ground condition logic 182 or recommendation logic 184, for example. It can be done in other ways as well, and this is indicated by block 426.

Method 400 proceeds at block 430 where machine 104 begins towing the implement 102 across the worksite.

At block 440, a position of the frame carrying sensor 106, relative to the ground surface 138, is sensed with sensor 106. The position of the frame relative to the ground surface can be sensed by the sensor 106 sensing the distance to ground-following device 130. For example, sensor 106 can sense the distance from sensor 106 to the indicating surface 134 of the distal end of ground-following device 130. This is indicated by block 439. In another example, where surface cleaning mechanism 149 is used, sensor 106 directly senses the surface 138 of the ground behind mechanism 149. This is indicated by block 441. In addition, the offset from sensor 106 to the tools 108, 112, 116 can be sensed as well. For instance, this can be sensed by sensing the relative position of the frame carrying sensor 106 and the frames carrying tools 108, 112, 116 using sensors 123 and 125 or other sensors. This is indicated by block 442.

Method 400 proceeds at block 450 where the depth of engagement identifier logic 153 identifies the depth of engagement of the ground-engaging tools 108, 112, and 116, with the ground. By knowing the position of the frame carrying sensor 106 relative to the ground (based on the sensor signal from sensor 106) and by knowing the offset of the frame (or sensor 106) relative to the ground engaging tools, logic 153 determines the depth of engagement of the ground-engaging tools with the ground over which implement 102 is traveling.

It will be noted that, in one example, the signals from sensor 106 can be overaged (or otherwise aggregated) over time to obtain a representative signal. As described above, the values indicating actuator position can be stored under certain circumstances (such as when making a headland turn or otherwise) so the depth of engagement can be quickly retrieved and reset without having to wait for the signal from sensor 106 to be averaged. The fact that implement 102 is making a turn can be detected using a signal from a GPS receiver or other positioning system or based on a signal indicating that implement 102 was raised and is being lowered again, or in other ways.

Once the signal from sensor 106 is obtained at block 460, threshold comparison logic 155 determines whether the depth of engagement is within the threshold value. At block 460, if the depth of engagement is within the threshold value, then processing returns to block 430 where the implement is towed across the worksite without adjustment. If it is determined at block 460 that the depth of engagement is not within the threshold value, then processing proceeds to block 462 where actuator adjustment logic 154 identifies actuator adjustments that need to be made to bring the depth of engagement back within the threshold value. Control signal generator logic 156 then generates control signals that control actuators 124 to adjust the depth of engagement of the ground-engaging tools, based on the adjustments identified by logic 154. This is indicated by block 470.

The depth of engagement can be adjusted using hydraulic actuators, as indicated by block 471, electric actuators, as indicated by block 472, or through other suitable mechanisms, as indicated by block 473. As discussed above, the depth can be adjusted automatically, as indicated by block 474. The depth can also be adjusted by the operator 172, as indicated by block 475. The depth can also be adjusted using any other suitable techniques as well, as indicated by block 476.

Processing then proceeds to block 480 where it is determined whether the job is complete. If it is determined that the job is not complete, processing returns to block 430, where towing vehicle 104 continues to tow implement 102 with the tools engaging the ground. If it is determined at block 480 that the job is complete, then processing ends until another job is to be started where processing will again begin at block 410.

It will be also noted that, at any point during the operation, actuator adjustment logic 154 can adjust the bias force of ground following device 130 and/or surface cleaning mechanism 149. Logic 154 can do this based on variables sensed in near real time (such as soil conditions, or other variables) or based on stored or otherwise predetermined values. For instance, historic values may indicate that a particular bias force has been used at certain geographic locations, or under certain conditions, etc. In those cases, logic 154 can retrieve bias force values from data store 184 and control the actuators to apply force based on those values.

Figure 4A:
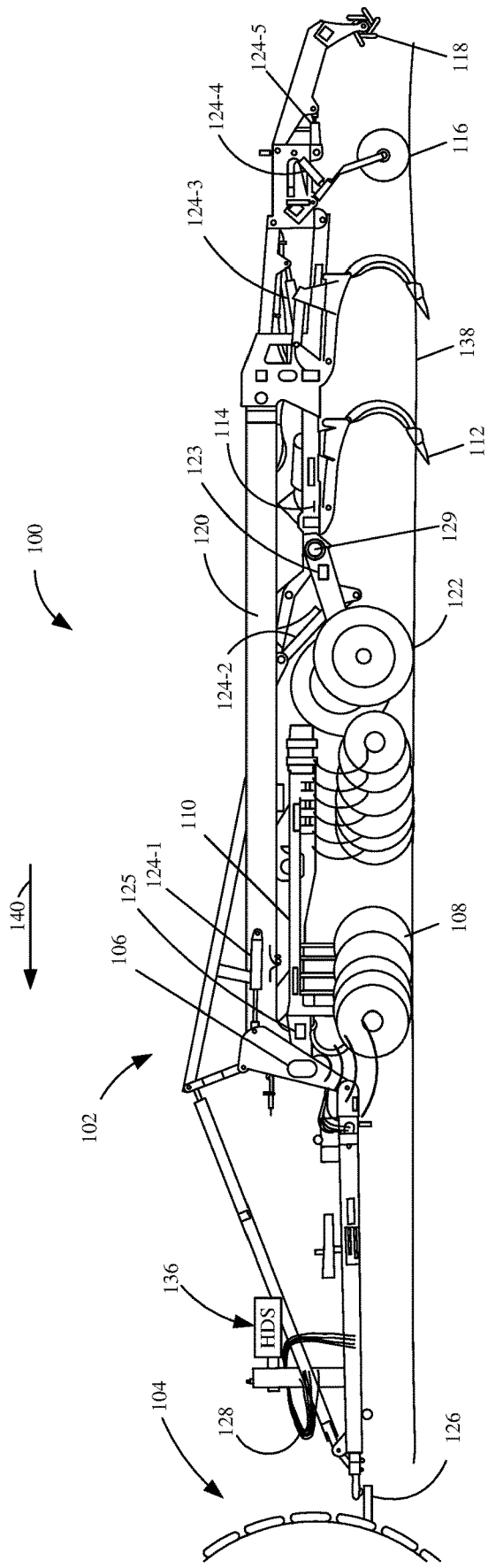
FIG. 4A is similar to FIGS. 1A and 1B but without the ground following device or the surface cleaning mechanism.

FIG. 4A is similarly to FIG. 1A except that there is no ground following device 130. Instead, sensor 106 is configured to directly sense the surface 138 of the ground over which implement 102 is traveling. As discussed above, the signal from sensor 106 may thus be indicative of obstacles on surface 138 (such as residue, root balls, rocks, etc.) instead of the actual ground surface. However, given sufficient time, the signal from sensor 106 can be filtered and aggregated to obtain an accurate indication of the height of frame 122 above the actual ground surface. Therefore, in one example, the signal from sensor 123 is used to obtain a quick, but relatively "coarse" frame height and the signal from sensor 106 is used to obtain a slower, but more accurate, fine tuning value that can be used to correct the coarse frame height obtained by sensor 123. The frame height is used to identify the depth of engagement of the ground engaging tools.

Figure 4B:
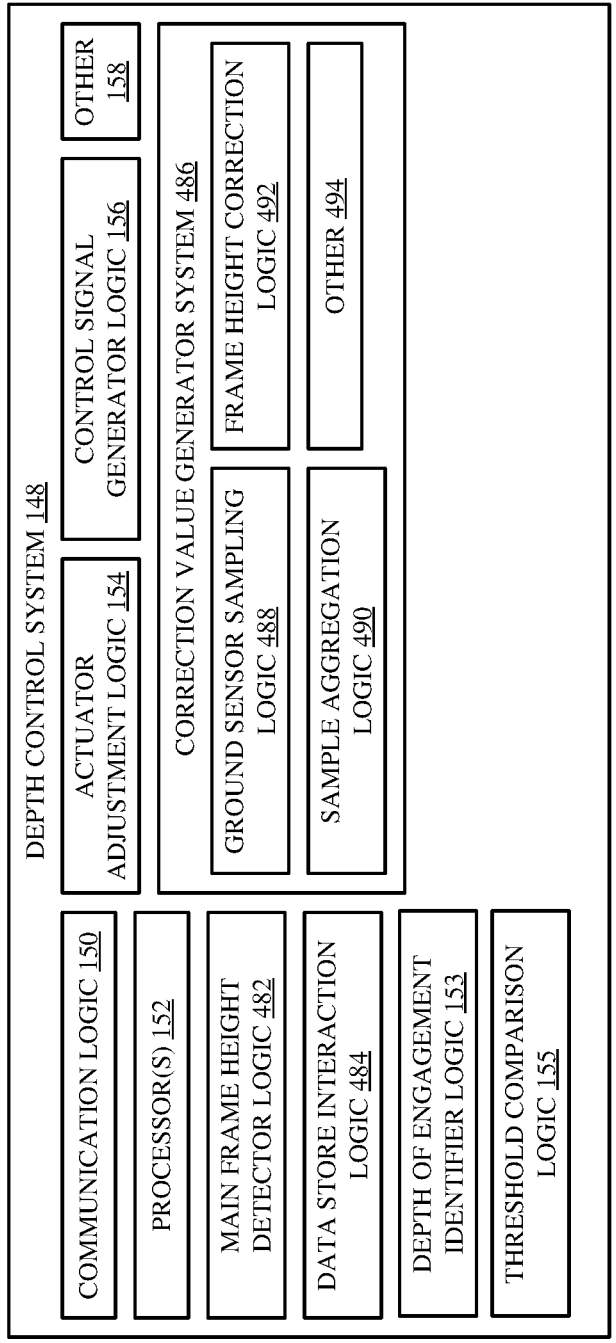
FIG. 4B is a block diagram showing another example of a depth control system.

FIG. 4B is a block diagram showing another example of depth control system 148 that can be used with the machine configuration system shown in FIG. 4A. Depth control system 148, shown in FIG. 4B, is similar to depth control system 148 shown in FIG. 2, and similar items are similarly numbered. However, depth control system 148, illustrated in FIG. 4B, also includes main frame height detector logic 482, data store interaction logic 484, and correction value generator system 486. Correction value generator system 486, itself, includes ground sensor sampling logic 488, sample aggregation logic 490, frame height correction logic 492, and it can include a wide variety of other items 494. Before describing the operation of the example of depth control system 148 shown in FIG. 4B, a brief description of the items in system 148, and their operation, will first be provided.

As described above with respect to FIG. 2, the depth control system 148 shown in FIG. 2 controls the depth of engagement of the ground engaging tools by sensing a distance from sensor 106 to the surface of the ground (using ground following device 130 and/or ground cleaning device 149) and then calculating the offset between where sensor 106 mounted on frame 120, and the ground engaging tools. Using the height of frame 120 as determined from sensor 106 and the offset to the tools, system 148 (shown in FIG. 2) determines the depth of engagement of the tools, because it accurately knows the position of the ground surface 138 relative to sensor 106.

In another example, however, sensor 106 can be used without ground following device 130 or surface cleaning device 149. Even when traveling over a surface 138 that is relatively uneven (such as one that includes root balls, residue, etc.) sensor 106, over time, will tend to give a relatively accurate indication of the distance between sensor 106 and the actual ground surface 138. This is because, by filtering the sensor signal from sensor 106, and aggregating multiple sensor signal samples over time, the effects of residue, debris, root balls, etc. on the ground surface 138 can be greatly reduced so that the filtered, aggregated sensor signal samples tend to give a relatively accurate indication of the distance of sensor 106 relative to the ground surface 138 (and thus a relatively accurate indication of the height of frame 120 above ground surface 138).

However, if the depth of engagement of the ground engaging tools were based only off of the sensor signal from sensor 106 (without ground following device 130 or ground cleaning device 149), this can lead to issues with the reaction time (or responsiveness) needed to control the depth of engagement. This is because the sensor signal from sensor 106 needs to be filtered and aggregated over time (or over multiple samples), in order to be relatively accurate. Also, when dynamically moving the machine in a vertical manner (such as raising or lowering the ground engaging tools) while traveling, this variance in frame height (due to the raising or lowering operation) is added to the variation in frame height sensed by sensor 106 due to the uneven surface (e.g., due to root balls, debris, residue, etc.). This can make it even more difficult for the control system to find an initial frame height that corresponds to a depth set point input by the operator (or automatically input).

In contrast, using only the sensor input from sensor 123 (which is indicative of the offset between wheels 122 and the main frame 120) carries with it the disadvantages mentioned above (e.g., this type of sensor input does not accommodate for the wheels sinking into a soft soil surface, variances in machine weight, soil type, vehicle draw bar height, for instance). FIGS. 4A-5 thus show yet another example, in which sensor 106 can be used in conjunction with sensor 123, in order to control the depth of engagement of the ground engaging tools on implement 102.

In general, depth control system 148 (shown in FIG. 4B) uses sensor 123 (which senses the offset between main frame 120 and wheels 122) to quickly set a reasonably accurate frame height for frame 120 (and thus a reasonably accurate depth of engagement of the ground engaging tools). The sensor signal from sensor 123 can be used in near real time, because it need not be aggregated over as long a time as the sensor signals from sensor 106, or filtered as heavily, etc. Therefore, the frame height of frame 120 can be set very quickly, to a reasonably accurate setting, using only the sensor signal from sensor 123 and a desired tool depth setpoint.

Once the desired frame height for frame 120 is set, then system 148 can begin taking samples of the sensor signal from sensor 106. Those samples can be conditioned by filtering them, amplifying them, aggregating them over time, or over a certain number of samples, etc. This may take additional time, but eventually, the sensor signal from sensor 106 will stabilize giving a relatively accurate indication of the distance from sensor 106 to ground surface 138 (and thus indicative of the height of frame 120 relative to the surface 138 of the ground). That indication can be used to generate a correction value that corrects the frame height generated based on the signal from sensor 123. It is thus used to fine tune the course height of the frame generated based on the signal from sensor 123, because it will account for wheels 122 sinking into soft soil, riding over bumps, the height of the vehicle draw bar, etc.

Main frame height detector logic 482 illustratively detects the height of frame 120 relative to wheels 122 based on the sensor signal from sensor 123, which is indicative of this offset. Again, sensor 123 may be a potentiometer that measures the degree of rotation of the support for wheels 122 about pivot point 129 where they are mounted to frame 120. It can be an optical sensor that senses that offset. It can sense the amount of extension of actuator 124-2. It can be a hall effect sensor or any of a wide variety of other sensors. Based upon the sensor input from sensor 123, main frame height detector logic 482 determines an estimated height of main frame 120 off of surface 138 by knowing a relationship (or dimensions) of the various parts of implement 102 indicative of the offset between frame 120 and wheels 122.

Data store interaction logic 484 illustratively interacts with data store 184 to determine whether any correction values have already been generated for this implement, for the estimated frame height. If so, data store interaction logic 484 provides that value to correction value generator system 486 (described below) and the correction value is applied to the frame height detected by detector logic 482.

Depth of engagement identifier 153 then identifies the depth of engagement of the tools based on the frame height (or the corrected frame height). Threshold comparison logic 155 then determines whether the depth of engagement is within a threshold value of the depth set point. If so, then no action needs to be taken. If not, however, then as discussed above with respect to FIG. 2, actuator adjustment logic 154 determines any actuator adjustments for actuators 124 that are to be made in order to bring the depth of engagement within a threshold value of the set point. Control signal generator logic 156 then generates actuator control signals, based upon the actuator adjustments identified by actuator adjustment logic 154. The actuators 124 are controlled in order to obtain a frame height that results in a depth of engagement that is within the threshold value of the set point.

As implement 102 is towed in the direction indicated by arrow 140, sensor 106 senses the distance between sensor 106 and the surface 138 of the ground over which implement 102 is traveling. Correction value generator system 486 identifies the frame height of frame 120 above the ground based on the signal from sensor 106 and generates a correction value, where needed, to correct the frame height value that is identified based on the output of sensor 123.

In order to use the signal from senor 106, ground sensor sampling logic 488 begins sampling the sensor signal output from sensor 106 once implement 102 is in a steady state condition. For example, it may be that, when the towing vehicle 104 makes a headland turn, the operator raises the ground engaging tools (e.g., frame 120 which raises the tools) so that they are out of contact with the ground. After the turn is made, the operator may lower the ground engaging tools so that they are back in engagement with the ground. During the raising and lowering operation, the signal from sensor 106 will not be used, because the ground engaging tools are out of engagement with the ground. However, once the tools have been again lowered so that they are in engagement with the ground, and after a certain amount of time has passed (so the frame 120 is no longer being raised or lowered), or a certain distance has been traveled implement 102 is operating in a relatively steady state.

During that time, ground sensor sampling logic 488 illustratively takes samples of the sensor signal 106 until a sufficient number of samples have been obtained so they can be used to obtain a value indicative of the height of frame 120 above the ground (which can be used as a correction value). The number of samples can be determined in a wide variety of different ways. For instance, it may be that a pre-determined number of samples need to be taken in order to calculate the correction value. In another example, samples are taken until the samples do not differ from one another more than a threshold amount over a given time period. This will effectively filter out sensor signals that are based on aberrant conditions (such as when sensor 106 is sensing the presence of a root ball, a rock, etc.). In another example, the sensor signal from sensor 106 is sampled for a pre-determined amount of time. In any case, ground sensor sampling logic 488 takes a desired number of samples of sensor signal 106.

Sample aggregation logic 490 aggregates those samples in order to obtain an aggregated value. The sensor signal samples can be aggregated in a wide variety of different ways. They can be aggregated in an additive manner, averaged, a median value can be identified, they can be clustered or grouped in a wide variety of other ways as well. The aggregated sensor signal value will thus be relatively accurate in indicating the distance between sensor 106 (and thus frame 120) and the ground surface 138 of the ground over which implement 102 is traveling. Frame height correction logic 492 then determines whether the frame height (as determined based upon the signal from sensor 123) is the same as the frame height indicated by the aggregated sensor signal from sensor 106 generated by logic 490. If the two are not the same, then a correction value is generated based upon the difference between those two frame heights. For instance, frame height correction logic 492 may be configured to consider the aggregated value generated from logic 490 as being more accurate than the frame height generated based on the sensor signal from sensor 123. Therefore, the correction value will be a value that corrects the frame height to that indicated by the aggregated value generated by sample aggregation logic 490. In another example, the two values (the value generated based on the aggregated sensor signal values, and the value generated based on the sensor signal from sensor 123, may be weighted and combined to obtain a corrected value. The correction can be generated from one or both sensor signals in a wide variety of other ways as well.

Once depth set point correction logic 492 corrects the frame height value, depth of engagement identifier logic 153 identifies the depth of engagement based on the frame height, threshold comparison logic 155 again compares the depth of engagement to the set point in order to determine whether the depth is within the threshold value of the set point. If not, again actuator adjustment logic 154 identifies actuator adjustments that need to be made and control signal generator logic 156 generates control signals to make those adjustments. This type of operation continues as long as implement 102 is being towed through the field.

Figure 5A:
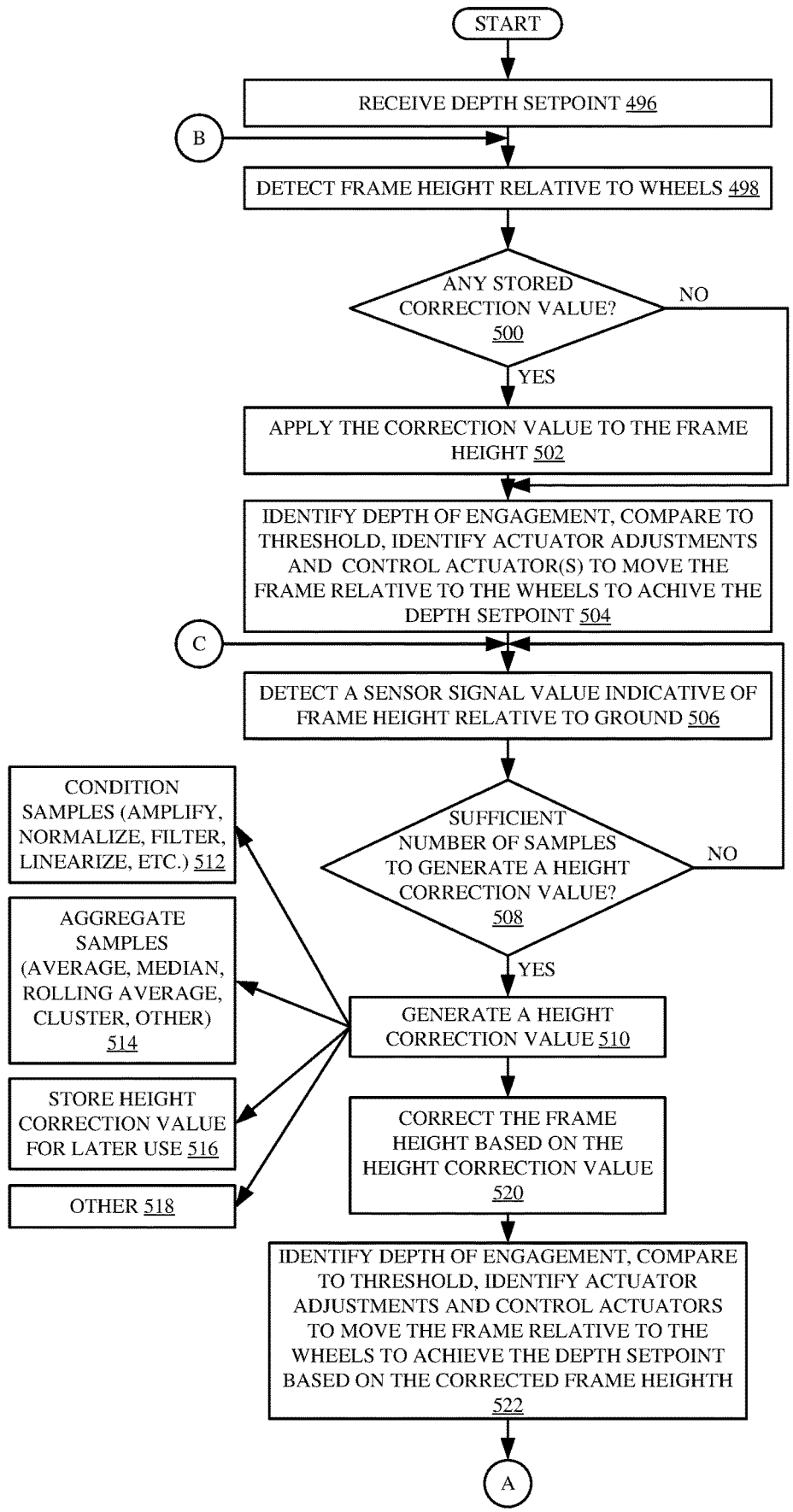
FIGS. 5A and 5B (collectively referred to herein as FIG. 5) show a flow diagram illustrating one example of the operation of an implement with the depth control system shown in FIG. 4B.
Figure 5B:
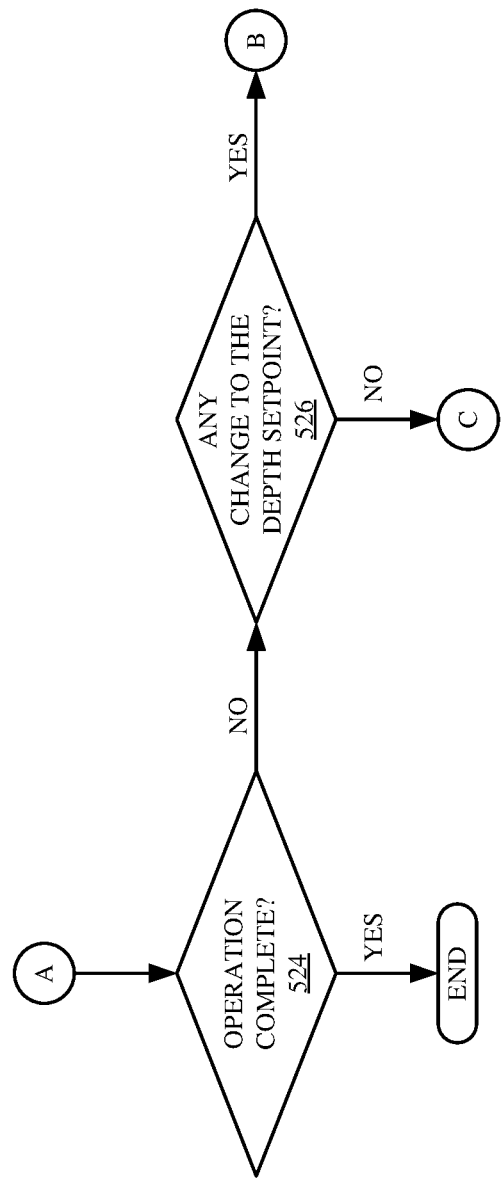

FIGS. 5A and 5B (collectively referred to herein as FIG. 5) illustrate a flow diagram showing one example of the operation of depth control system 148 on implement 102 (shown in FIG. 4A) in controlling the depth of engagement of the ground engaging tools. It is first assumed that depth control system 148 receives the depth set point as described above. This is indicated by block 496 in the flow diagram of FIG. 5.

Main frame height detector logic 482 then detects the frame height relative to wheels 122 based upon the sensor signal from sensor 123. This is indicated by block 498. Again, this is a coarse indication of the depth of engagement of the ground engaging tools, so long as the wheels 122 are riding across surface 138, and so long as the varying dimensions of implement 102, and towing vehicle 104 are accounted for. To the extent any of those items are not accounted for, then the main frame height identified based on the sensor signal from sensor 123 may be inaccurate.

As mentioned above, it may be that a correction value has already been generated for the detected main frame height (or for the depth set point). For instance, if a correction value was generated at the end of a pass in a field, and the machine has made a headland turn and is now making a second pass, then the correction value that was saved at the end of the previous pass may be relatively accurate for the second pass, and can be applied to the measured frame height. Determining whether there are any stored correction values for the present frame height is indicated by block 500. If so, applying the correction value to the frame height value is indicated by block 502.

After the correction value is applied, or if no correction value has been stored, processing continues at block 504 where depth of engagement identifier logic 153 identifies the depth of engagement of the ground engaging tools based on the frame height, and threshold comparison logic 155 compares the depth of engagement to the set point to determine whether it is within a threshold value of the set point. Actuator adjustment logic 154 determines any actuator adjustments that need to be made based on that comparison and control signal generator logic 156 generates control signals to control the actuators to bring the frame height to a proper position so that the depth of engagement is within the threshold value. This is indicated by block 504 in FIG. 5.

Ground sensor sampling logic 488 then detects sensor signal values indicative of the frame height of frame 120 relative to ground (e.g., it samples the sensor signals generated by sensor 106). This is indicted by block 506 in the flow diagram of FIG. 5.

Sample aggregation logic 490 then determines whether a sufficient number of samples have been obtained to generate a height correction value. This is indicated by block 508. Again, as discussed above, the number of samples sufficient to generate the correction value can be determined in a wide variety of different ways. The number of samples can be based on the variation between different samples, it can be based on a pre-determined number of samples or a time over which samples are to be taken, or a wide variety of other ways.

Once a sufficient number of samples have been taken, frame height correction logic 492 generates a height correction value. The correction value is indicative of a value that is applied to the frame height that is determined based on the sensor signal from sensor 123. The correction value will correct that frame height to be more accurate based upon the correction value, so the depth of engagement of the ground engaging tools will also be more accurate. Generating a frame height correction value is indicated by block 510 in FIG. 5.

In order to generate the height correction value, the samples from sensor 106 can be conditioned (such as amplified, normalized, filtered, linearized, etc.). This is indicated by block in the flow diagram of FIG. 5. The conditioned samples are then illustratively aggregated by aggregation logic 490. This is indicated by block 514. The signals can be aggregated in a wide variety of different ways, such as averaged, processed to obtain a median value, a rolling average value, or they can be clustered or grouped or aggregated in a variety of different ways as well.

Frame height correction logic 492 can also use data store interaction logic 484 to store the correction value in data store 184. The correction value can be stored along with (or indexed by) a wide variety of different information. For instance, it can be stored along with its geographic location, along with the depth set point, along with the measured frame height (that is measured using sensor 123), along with the frame height measured from the sensor signal generated by sensor 106, along with current soil conditions, weather conditions, or a wide variety of other information. Storing the frame height correction value for later use is indicated by block 516. The frame height correction value can be generated in a wide variety of other ways as well, and this is indicated by block 518.

Frame height correction logic 492 also corrects the frame height that is determined by logic 482, based upon the sensor signal from sensor 123. Correcting the frame height based upon the height correction value is indicated by block 520. As discussed above, this can be done in a wide variety of different ways, such as correcting the frame height measured by logic 482 to be that indicated by sensor 106. It can combine those two values and generate a combined frame height value (such as by weighting the two values, averaging them, etc.).

Depth of engagement identifier logic 153 then identifies the depth of engagement based on the corrected frame height, and threshold comparison logic 155 then compares the corrected depth of engagement of the ground engaging tools to the depth set point to determine whether the two are within a threshold value of one another. If not, actuator adjustment logic 154 identifies actuator adjustments that need to be made to bring them within the threshold value of one another, and control signal generator logic 156 generates the actuator control signals to move the frame relative to the wheels 122 in order to achieve the depth set point, based upon the corrected frame height. This is indicated by block 522 in the flow diagram of FIG. 5.

If the operation is complete, then processing ends, as indicated by block 524. However, if the process is not complete (e.g., the tillage operation is not complete) then the depth control system 148 determines whether there has been any change to the depth set point (e.g., whether the operator has changed it, whether it has been automatically changed, etc.). This is indicated by block 526. If not, processing continues at block 506 where the system continues to monitor the sensor signal generated by sensor 106 to make frame height corrections.

However, if, at block 526, there has been a change to the depth set point, then processing reverts to block 498 where main frame height detector logic 482 again detects the height of the main frame relative to wheels 122 using sensor 123, any stored correction values are applied to the frame height, and the actuators are quickly actuated based on the relatively coarse main frame height value (determined based on the sensor signal from sensor 123) to obtain the new depth set point. That value is then, eventually, corrected using the sensor signal from sensor 106 (which may take longer to process, but which is likely more accurate). It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one example, the processors and servers include computer processors with associated memory and timing circuitry, not separately shown. They are functional parts of the systems or devices to which they belong and are activated by and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 6:
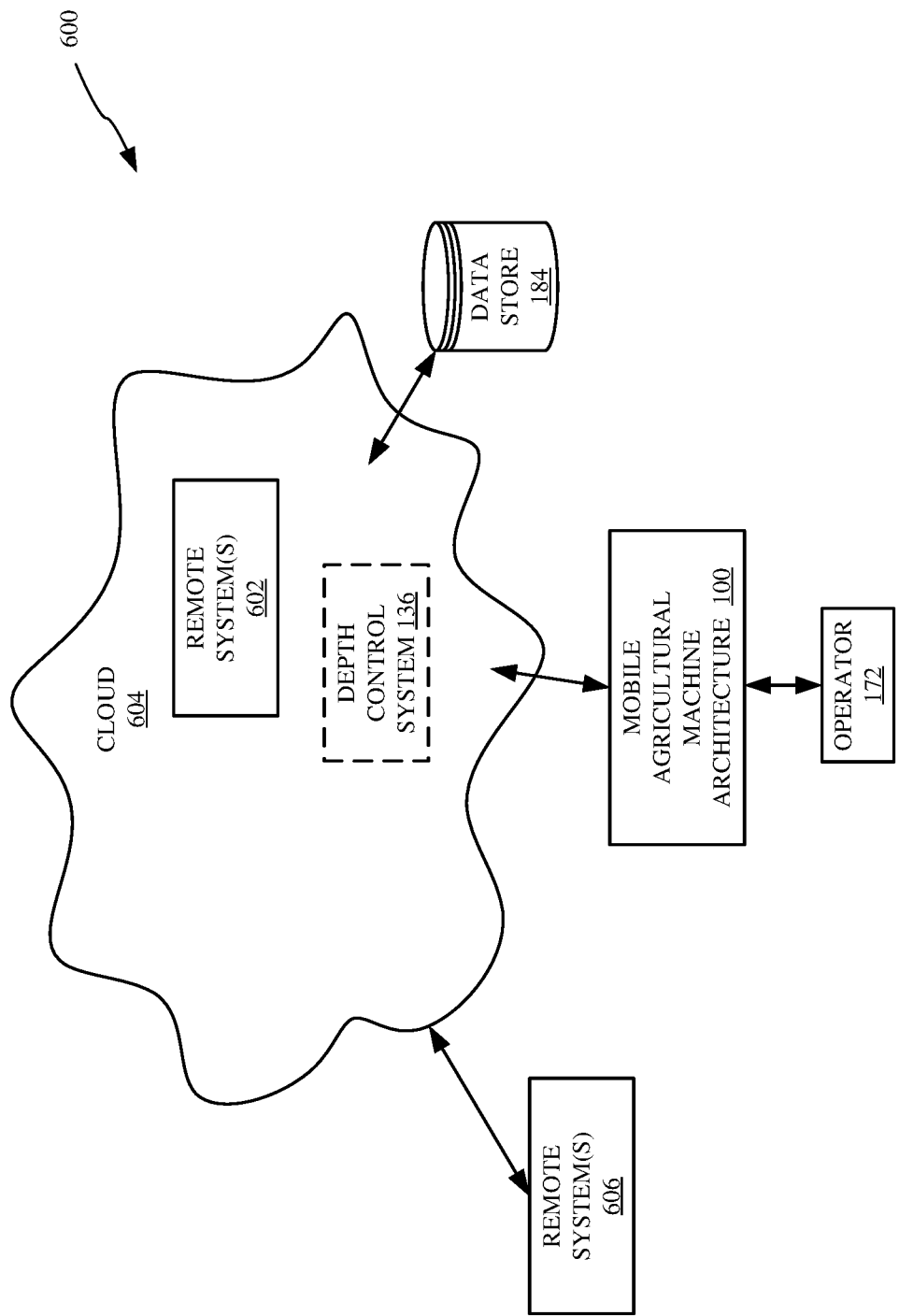
FIG. 6 is a block diagram of a mobile agricultural machine deployed in a remote server architecture.

FIG. 6 is a block diagram of mobile agricultural machine architecture 100 deployed in a remote server architecture. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIGS. 2 and/or 4B as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 6, some items are similar to those shown in FIGS. 1A, 1B, 2, and 4A and 4B and they are similarly numbered. FIG. 6 specifically shows that depth control system 136, or remote severs 502, among other things can be located at a remote server location 504. Therefore, mobile agricultural machine architecture 100 accesses those systems through remote server location 504. FIG. 6 also shows that machine 102 or 104 can communicate with other remote systems 506 (such as a manager system, a supplier or vendor system, etc.) through remote sever location 504.

FIG. 6 also depicts another example of a remote server architecture. FIG. 6 shows that it is also contemplated that some elements of FIGS. 1A, 1B, 2, 4A and 4B are disposed at remote server location 504 while others are not. By way of example, data store can be disposed at a location separate from location 504, and accessed through the remote server at location 504. Regardless of where they are located, they can be accessed directly by work machine 102 or 104, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another work machine (such as a fuel truck) can have an automated information collection system. As the work machine comes close to the fuel truck for fueling, the system automatically collects the information from the work machine using any type of ad-hoc wireless connection. The collected information can then be forwarded to the main network as the fuel truck reaches a location where there is cellular coverage (or other wireless coverage). For instance, the fuel truck can enter a covered location when traveling to fuel other machines or when at a main fuel storage location. All of these architectures are contemplated herein. Further, the information can be stored on the work machine until the work machine enters a covered location. The work machine, itself, can then send the information to the main network.

It will also be noted that the elements of FIGS. 1A, 1B, 2, 4A and 4B or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
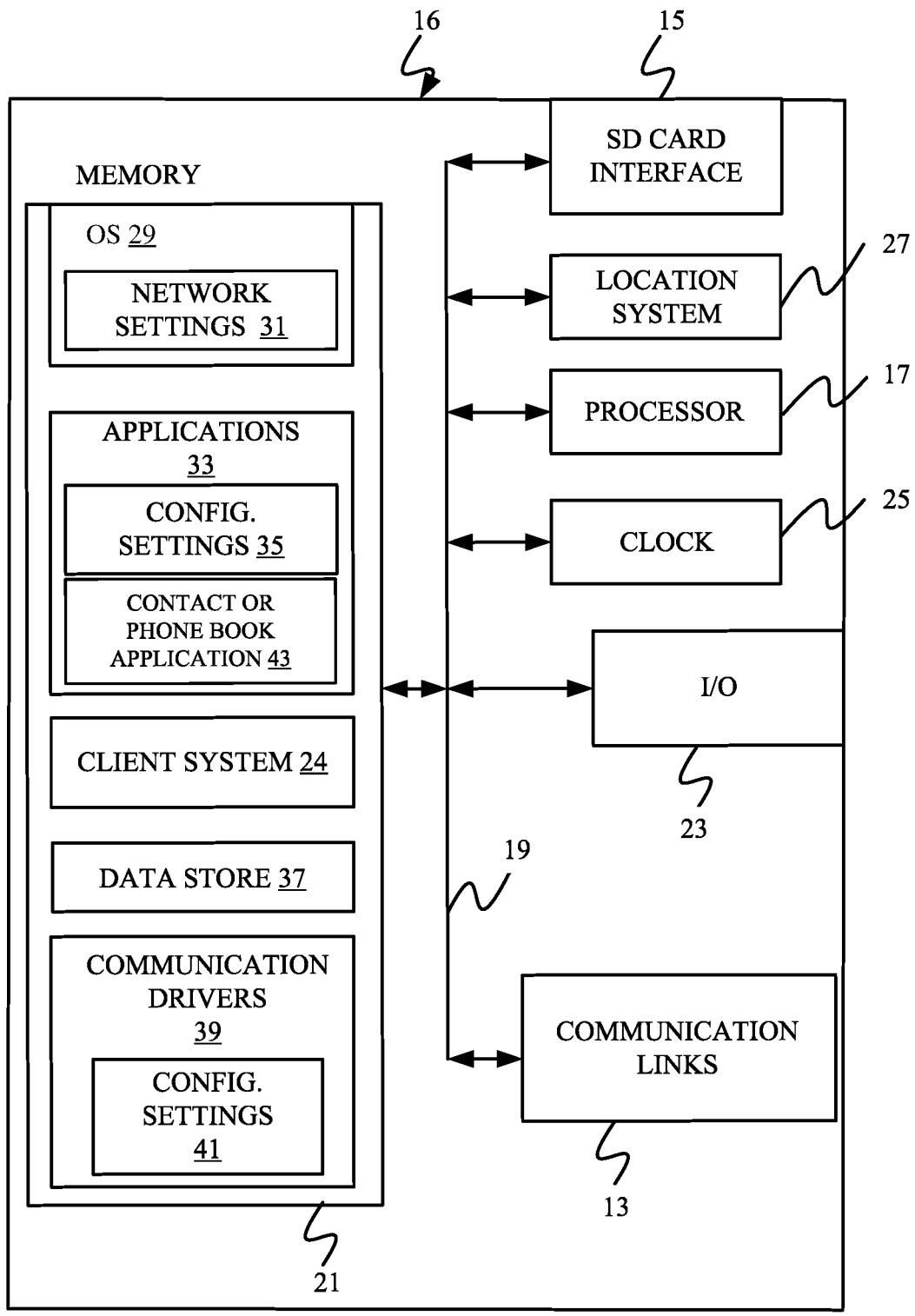
FIG. 7 is a simplified block diagram of a handheld or mobile computing device that can be used in the machines and architecture shown in the previous FIGS.
Figure 8:
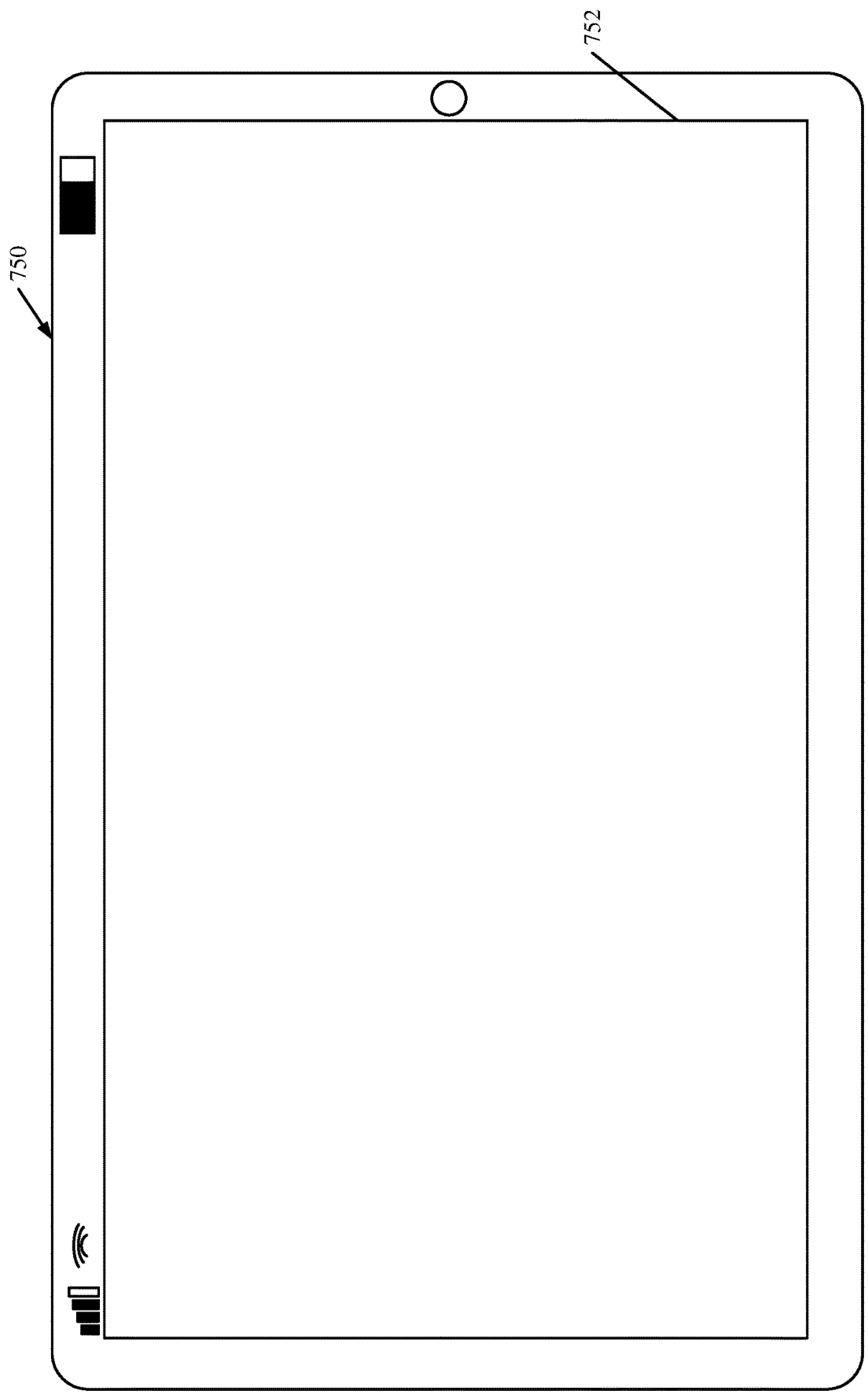
FIG. 8 shows one example of handheld or mobile computing device that can be used in the machines and architectures shown in the previous FIGS.
Figure 9:
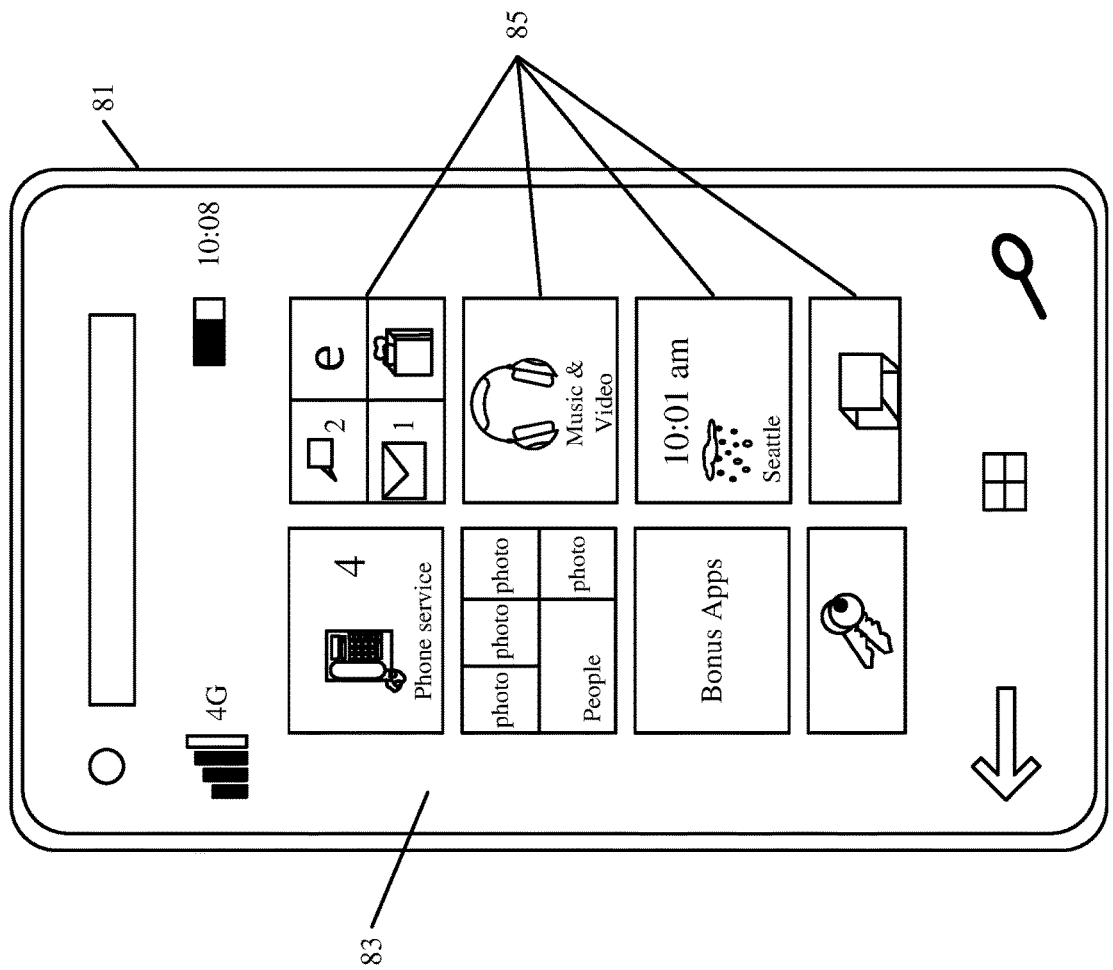
FIG. 9 shows one example of a handheld or mobile computing device that can be used in the machines and architectures shown in the previous FIGS.

FIG. 7 is a simplified block diagram of one illustrative example of a handheld or mobile computing device that can be used as a user's or client's hand held device 16, in which the present system (or parts of it) can be deployed. For instance, a mobile device can be deployed in the operator compartment of towing vehicle 104 for use in generating, processing, or displaying height and depth determinations, recommendations, etc. FIGS. 8-9 are examples of handheld or mobile devices.

FIG. 7 provides a general block diagram of the components of a client device 16 that can run some components shown in FIGS. 1A, 1B, 2, 4A and 4B, that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

Under other examples, applications can be received on a removable Secure Digital (SD) card that is connected to an interface 15. Interface 15 and communication links 13 communicate with a processor 17 (which can also embody processor(s) from previous Figures) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16.

This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 8 shows one example of handheld or mobile computing device that can be used in the machines and architectures shown in the previous FIGS. 1n FIG. 6, device 750 is a tablet computer. Tablet 750 is shown with user interface display screen 752. Screen 752 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Tablet 750 can also illustratively receive voice inputs as well.

FIG. 9 shows one example of a handheld or mobile computing device that can be used in the machines and architectures shown in the previous FIGS. The device in FIG. 9 is a smart phone 81. Smart phone 81 has a touch sensitive display 83 that displays icons or tiles or other user input mechanisms 85. Mechanisms 85 can be used by a user to run applications, make calls, perform data transfer operations, etc. In general, smart phone 81 is built on a mobile operating system and offers more advanced computing capability and connectivity than a feature phone. Note that other forms of the devices 16 are possible.

Figure 10:
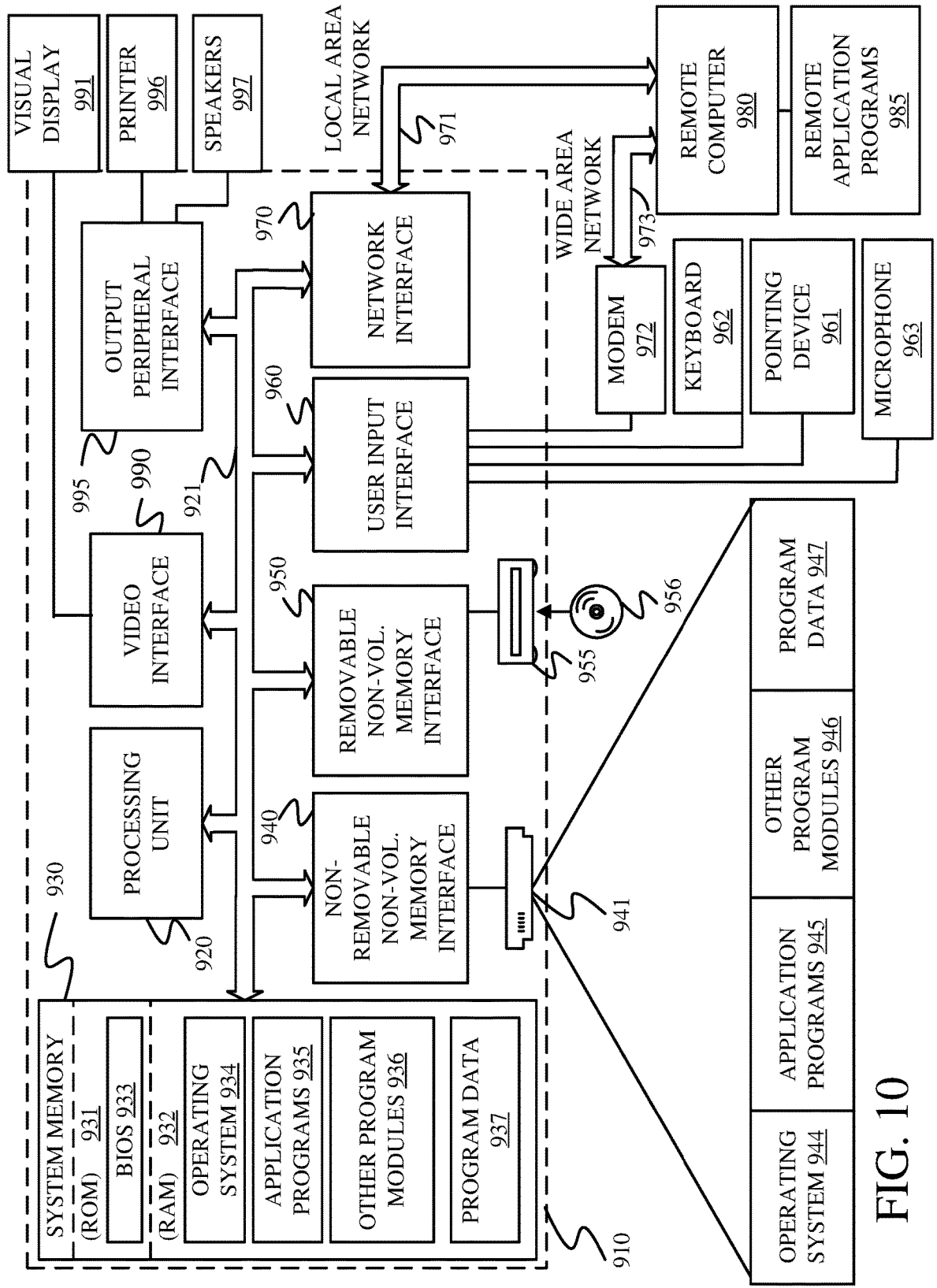
FIG. 10 shows one example of a computing environment that can be used in the machines and architectures shown in the previous FIGS.

FIG. 10 shows one example of a computing environment that can be used in the machines and architectures of the previous FIGS. With reference to FIG. 10, an example system for implementing some examples includes a general-purpose computing device in the form of a computer 910. Components of computer 910 can include, but are not limited to, a processing unit 920 (which can comprise processor(s) from previous FIGS.), a system memory 930, and a system bus 921 that couples various system components including the system memory to the processing unit 920. The system bus 921 can be any of several types of bus structures including a memory bus or memory controller, a peripheral bus, and a local bus using any of a variety of bus architectures. Memory and programs described with respect to previous FIGS. can be deployed in corresponding portions of FIG. 10.

Computer 910 typically includes a variety of computer readable media. Computer readable media can be any available media that can be accessed by computer 910 and includes both volatile and nonvolatile media, removable and non-removable media. By way of example, and not limitation, computer readable media can comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 910. Communication media can embody computer readable instructions, data structures, program modules or other data in a transport mechanism and includes any information delivery media. The term "modulated data signal" means a signal that has one or more of its characteristics set or changed in such a manner as to encode information in the signal.

The system memory 930 includes computer storage media in the form of volatile and/or nonvolatile memory such as read only memory (ROM) 931 and random access memory (RAM) 932. A basic input/output system 833 (BIOS), containing the basic routines that help to transfer information between elements within computer 810, such as during start-up, is typically stored in ROM 931. RAM 932 typically contains data and/or program modules that are immediately accessible to and/or presently being operated on by processing unit 920. By way of example, and not limitation, FIG. 10 illustrates operating system 934, application programs 935, other program modules 936, and program data 937.

The computer 910 can also include other removable/non-removable volatile/nonvolatile computer storage media. By way of example only, FIG. 8 illustrates a hard disk drive 941 that reads from or writes to non-removable, nonvolatile magnetic media, an optical disk drive 955, and nonvolatile optical disk 956. The hard disk drive 941 is typically connected to the system bus 921 through a non-removable memory interface such as interface 940, and optical disk drive 955 are typically connected to the system bus 921 by a removable memory interface, such as interface 950.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 10, provide storage of computer readable instructions, data structures, program modules and other data for the computer 910. In FIG. 10, for example, hard disk drive 941 is illustrated as storing operating system 944, application programs 945, other program modules 946, and program data 947. Note that these components can either be the same as or different from operating system 934, application programs 935, other program modules 936, and program data 837.

A user can enter commands and information into the computer 910 through input devices such as a keyboard 962, a microphone 963, and a pointing device 961, such as a mouse, trackball or touch pad. Other input devices (not shown) can include a joystick, game pad, satellite dish, scanner, or the like. These and other input devices are often connected to the processing unit 920 through a user input interface 960 that is coupled to the system bus, but can be connected by other interface and bus structures. A visual display 991 or other type of display device is also connected to the system bus 921 via an interface, such as a video interface 990. In addition to the monitor, computers can also include other peripheral output devices such as speakers 997 and printer 996, which can be connected through an output peripheral interface 995.

The computer 910 is operated in a networked environment using logical connections (such as a local area network—LAN, or wide area network-WAN, or a controller area network-CAN) to one or more sensors or remote computers, such as a remote computer 980, or other components.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. In a networked environment, program modules can be stored in a remote memory storage device. FIG. 9 illustrates, for example, that remote application programs 985 can reside on remote computer 980.

It should also be noted that the different examples described herein can be combined in different ways. That is, parts of one or more examples can be combined with parts of one or more other examples. All of this is contemplated herein.

Example 1 is a mobile machine, comprising:
a frame;
a set of wheels supporting the frame and mounted by a wheel support that is movable relative to the frame;
an actuator that drives movement of the set of wheels relative to the frame;
a first sensor sensing a position of the wheel support relative to the frame and generating a first frame height sensor signal indicative of the position of the wheel support relative to the frame;
main frame height detector logic that generates a frame height value indicative of a height of the frame above a ground surface over which the mobile machine is traveling based on the frame height sensor signal;
a set of ground engaging tools mounted to the frame and movable relative to the wheels to change a depth of engagement of the ground engaging tools with the ground over which the mobile machine travels;
a second sensor sensing a height of the frame above the surface over which the mobile machine is traveling and generates a second frame height sensor signal indicative of the sensed height of the frame above the surface;
a correction value generator system that generates a frame height correction value indicative of a correction to the frame height value based on the second frame height sensor signal to obtain a corrected frame height value; and
a depth control system that generates an actuator control signal to control the actuator to move the wheels based on the corrected frame height value.

Example 2 is the mobile machine of any or all previous examples and further comprising:
height determination logic configured to receive the corrected frame height value and identify a measured depth of engagement of the set of ground engaging tools with the ground, based on the corrected frame height value, and to generate a depth output indicative of the depth of engagement.

FIG. 3 is the mobile machine of any or all previous examples wherein the depth control system comprises:

threshold comparison logic configured to receive a depth setpoint indicative of a target depth of engagement of the set of ground engaging wheels and to compare the measured depth of engagement with the target depth of engagement to determine whether the measured depth of engagement is within a threshold value of the target depth of engagement and to generate a comparison result indicative of a result of the comparison.

Example 4 is the mobile machine of any or all previous examples wherein the depth control system is configured to generate the actuator control signal based on the comparison result.

Example 5 is the mobile machine of any or all previous examples wherein the correction value generator logic comprises:
sensor sampling logic configured to detect a plurality of different samples of the second frame height sensor signal.

Example 6 is the mobile machine of any or all previous examples wherein the correction value generator logic comprises:
sample aggregation logic configured to aggregate the samples to obtain an aggregated sensor signal value.

Example 7 is the mobile machine of any or all previous examples wherein the frame height correction logic is configured to compare the aggregated sensor signal value with the first frame height value from the main frame height detector logic to determine whether a correction is to be performed.

Example 8 is the mobile machine of any or all previous examples wherein, if the frame height correction logic determines that a correction is to be performed, the frame height correction logic is configured to generate the frame height correction value.

Example 9 is the mobile machine of any or all previous examples wherein the frame height correction logic is configured to generate the frame height correction value by substituting the frame height value generated by the main frame height detector logic with a frame height value based on the aggregated sensor signal value.

Example 10 is the mobile machine of any or all previous examples wherein the frame height correction logic is configured to generate the frame height correction value by combining the frame height value generated by the main frame height detector logic with a frame height value based on the aggregated sensor signal value.

Example 11 is the mobile machine of any or all previous examples wherein the frame height correction logic is configured to determine whether the sensor sampling logic has performed sufficient sampling of the second frame height sensor signal before generating the corrected frame height value.

Example 12 is the mobile machine of any or all previous examples wherein the frame height correction logic is configured to determine whether the sensor sampling logic has performed sufficient sampling of the second frame height sensor signal by at least one of determining whether sample values of the samples have stabilized, by determining whether a predefined number of samples have been generated, by determining whether a predetermined sampling time has passed and by determining whether the mobile machine has moved a predetermined sampling distance over the surface.

Example 13 is the mobile machine of any or all previous examples and further comprising:
a data store configured to store an indication of the corrected frame height value; and depth recommendation logic configured to receive a set of recommendation criteria and generate a depth control recommendation based on the stored indication of the corrected frame height value and the recommendation criteria, wherein the depth control system is configured to generate the actuator control signal to control the actuator to move the wheels based on the depth control recommendation.

Example 14 is a method of controlling a mobile machine, comprising:
sensing, with a first sensor, a position of a wheel support, that movably supports a set of wheels relative to a frame of the mobile machine, relative to the frame;
generating a first frame height sensor signal indicative of the position of the wheel support relative to the frame;
generating a frame height value indicative of a height of the frame above a ground surface over which the mobile machine is traveling based on the frame height sensor signal;
a set of ground engaging tools mounted to the frame and movable relative to the wheels to change a depth of engagement of the ground engaging tools with the ground over which the mobile machine travels;
sensing, with a second sensor, a height of the frame above the surface over which the mobile machine is traveling;
generating a second frame height sensor signal indicative of the sensed height of the frame above the surface;
generating a frame height correction value indicative of a correction to the frame height value based on the second frame height sensor signal to obtain a corrected frame height value; and
generating an actuator control signal to control an actuator that drives movement of the set of wheels relative to the frame to move the wheels based on the corrected frame height value.

Example 15 is the method of any or all previous examples and further comprising:
identifying a measured depth of engagement of the set of ground engaging tools with the ground, based on the corrected frame height value; and
generating a depth output indicative of the depth of engagement.

Example 16 is the method of any or all previous examples wherein generating the actuator control signal comprises:
receiving a depth setpoint indicative of a target depth of engagement of the set of ground engaging wheels;
comparing the measured depth of engagement with the target depth of engagement to determine whether the measured depth of engagement is within a threshold value of the target depth of engagement;
generating a comparison result indicative of a result of the comparison; and
generating the actuator control signal based on the comparison result.

Example 17 is the method of any or all previous examples wherein generating the frame height correction value comprises:
detecting a plurality of different samples of the second frame height sensor signal;
aggregating the samples to obtain an aggregated sensor signal value; and
comparing the aggregated sensor signal value with the first frame height value from the main frame height detector logic to determine whether the frame height correction value is to be generated.

Example 18 is the method of any or all previous examples wherein generating the frame height correction value comprises:
generating the frame height correction value by substituting the frame height value with a frame height value based on the aggregated sensor signal value.

Example 19 is the method of any or all previous examples wherein generating the frame height correction value comprises:
combining the frame height value with a frame height value based on the aggregated sensor signal value.

Example 20 is a mobile machine, comprising:
a frame;
a set of wheels supporting the frame and mounted by a wheel support that is movable relative to the frame;
an actuator that drives movement of the set of wheels relative to the frame;
a first sensor sensing a position of the wheel support relative to the frame and generating a first frame height sensor signal indicative of the position of the wheel support relative to the frame;
main frame height detector logic that generates a frame height value indicative of a height of the frame above a ground surface over which the mobile machine is traveling based on the frame height sensor;
a set of ground engaging tools mounted to the frame and movable relative to the wheels to change a depth of engagement of the ground engaging tools with the ground over which the mobile machine travels;
a second sensor sensing a height of the frame above the surface over which the mobile machine is traveling and generates a second frame height sensor signal indicative of the sensed height of the frame above the surface;
a correction value generator system that generates a frame height correction value indicative of a correction to the frame height value based on the second frame height sensor signal to obtain a corrected frame height value;
height determination logic configured to receive the corrected frame height value and identify a measured depth of engagement of the set of ground engaging tools with the ground, based on the corrected frame height value, and to generate a depth output indicative of the depth of engagement; and
a depth control system that generates an actuator control signal to control the actuator to move the wheels based on the depth output.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A height determination system, comprising:
a first sensor configured to detect a characteristic indicative of a position of a wheel, coupled to a frame of a mobile machine, relative to the frame and generate a first frame height sensor signal indicative of the position of the wheel relative to the frame;
a second sensor configured to sense a height of the frame above a surface of a ground over which the mobile machine is configured to travel and generate a second frame height sensor signal indicative of the sensed height of the frame above the surface of the ground; and a control system configured to:
  generate a frame height value indicative of a height of the frame above the surface of the ground based on the first frame height sensor signal;
  generate a frame height correction value indicative of a correction to the frame height value based on the second frame height sensor signal to obtain a corrected frame height value; and
  generate a control signal to control the mobile machine based on the corrected frame height value.

2. The height determination of claim 1, wherein the control system is further configured to:
  identify a depth of engagement of aground engaging tool, coupled to the mobile machine, with the ground, based on the corrected frame height value, and to generate a depth output indicative of the depth of engagement of the ground engaging tool.

3. The height determination system of claim 2 wherein the depth control system is further configured to:
  compare the depth of engagement of the ground engaging tool a target depth of engagement of the ground engaging tool; and
  generate an output indicative of a result of the comparison.

4. The height determination system of claim 3, wherein the control system is configured to generate the control signal to actuate movement of the wheel, relative to the frame, based on the comparison.

5. The height determination system of claim 1 wherein the control system is further configured to:
  detect a plurality of different samples of the second frame height sensor; signal and
  aggregate the samples to obtain an aggregated sensor signal value indicative of a height of the frame above the surface of the ground.

6. The height determination system of claim 5 wherein the control system is further configured to:
  compare the aggregated sensor signal value to the frame height value to generate the frame height correction value.

7. The height determination system of claim 6 wherein the frame height correction value comprises an aggregation of the aggregated sensor signal value and the frame height value.

8. The height determination system of claim 7 wherein the aggregated sensor signal value and the frame height value are weighted.

9. The height determination system of claim 6 wherein the frame height correction value comprises the difference between the aggregated sensor signal value and the frame height value.

10. The height determination system of claim 9 wherein the corrected frame height value comprises a sum of the frame height correction value and the frame height value.

11. The mobile machine of claim 5 wherein the control system is further configured to:
  determine whether sufficient sampling of the second frame height sensor signal has occurred by at least one of: (i) determining whether sample values of the samples have stabilized; (ii) determining whether a predefined number of samples have been generated; (iii) determining whether a predetermined sampling time has passed; or (iv) determining whether the mobile machine has moved a predetermined sampling distance over the surface.

12. The mobile machine of claim 1 and further comprising:
  a data store configured to store an indication of the corrected frame height value; and
  recommendation logic configured to receive a set of recommendation criteria and generate a depth control recommendation based on the stored indication of the corrected frame height value and the recommendation criteria, wherein the control system is configured to generate the control signal to control an actuator to move the wheel, relative to the frame, based on the depth control recommendation.

13. A method of controlling a mobile machine, comprising:
  obtaining a first frame height sensor signal indicative of a position of a wheel relative to a frame of the mobile machine;
  obtaining a second frame height sensor signal indicative of a height of the frame above a surface of a ground;
  generating a frame height value indicative of a height of the frame above the surface of the ground based on the first frame height sensor signal;
  generating a frame height correction value indicative of a correction to the frame height value based on the second frame height sensor signal to obtain a corrected frame height value;
  generating a corrected frame height value indicative of a corrected height of the frame above the surface of the ground based on the frame height correction value; and
  generating a control signal to control the mobile machine based on the corrected frame height value.

14. The method of claim 13 and further comprising:
  identifying a depth of engagement of a ground engaging tool with the ground based on the corrected frame height value; and
  generating a depth output indicative of the depth of engagement.

15. The method of claim 14 wherein generating the control signal comprises:
  comparing the depth of engagement with a target depth of engagement;
  generating a comparison result indicative of a result of the comparison; and
  generating the control signal based on the comparison result.

16. The method of claim 15 wherein generating the frame height correction value comprises:
  detecting a plurality of different samples of the second frame height sensor signal;
  aggregating the samples to obtain an aggregated sensor signal value indicative of the height of the frame above the surface of the ground; and
  comparing the aggregated sensor signal value with the first frame height value to determine whether the frame height correction value is to be generated.

17. The method of claim 16 wherein generating the frame height correction value comprises:
  generating the frame height correction value by substituting the frame height value with a frame height value based on the aggregated sensor signal value.

18. The method of claim 16 wherein generating the frame height correction value comprises:
  aggregating the frame height value with a frame height value based on the aggregated sensor signal value.

19. A mobile machine, comprising:
  a frame;
  a wheel, coupled to the frame, that is movable relative to the frame;

an actuator configured to drive movement of the wheel relative to the frame;

a ground engaging tool mounted to the frame and configured to engage ground, at a depth;

a sensor configured to generate a first frame height sensor signal indicative of the position of the wheel relative to the frame;

a non-contact sensor configured to detect a surface of the ground and generate a second frame height sensor signal indicative of a height of the frame above the surface of the ground; and a control system configured to:
 generate a frame height value indicative of a height of the frame, above the surface of the ground based on the first frame height sensor signal;
 generate a frame height correction value indicative of a correction to the frame height value based on the second frame height sensor signal to obtain a corrected frame height value; and
 generate a control signal to control the actuator to move the wheel to adjust the depth of the ground engaging tool based on the corrected frame height value.

20. The mobile machine of claim 19, wherein the control system is further configured to:
 identify a depth of engagement of the ground engaging tool with the ground based on the corrected frame height value;
 compare the depth of engagement to a target depth of engagement; and
 wherein the Control signal controls the actuator to move the wheel, relative to the frame, based on the comparison of the depth of engagement to the target depth of engagement.

* * * * *